United States Patent
Noda et al.

(10) Patent No.: US 8,133,841 B2
(45) Date of Patent: Mar. 13, 2012

(54) HONEYCOMB CATALYTIC STRUCTURE, PRECOATED SUPPORT FOR PRODUCING HONEYCOMB CATALYTIC STRUCTURE, AND PROCESS FOR PRODUCING HONEYCOMB CATALYTIC STRUCTURE

(75) Inventors: Naomi Noda, Nagoya (JP); Yukio Miyairi, Nagoya (JP); Toshio Yamada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/025,377

(22) Filed: Feb. 4, 2008

(65) Prior Publication Data

US 2008/0125316 A1    May 29, 2008

Related U.S. Application Data

(63) Continuation of application No. PCT/JP2006/317268, filed on Aug. 31, 2006.

(30) Foreign Application Priority Data

Aug. 31, 2005 (JP) ................................ 2005-250873
Mar. 31, 2006 (JP) ................................ 2006-098911

(51) Int. Cl.
 *B01J 23/02* (2006.01)
(52) U.S. Cl. ............ 502/439; 422/180; 422/177; 501/80
(58) Field of Classification Search .................. 502/439, 502/334, 242; 422/180, 177; 501/80
See application file for complete search history.

(56) References Cited

U.S. PATENT DOCUMENTS

| | | | |
|---|---|---|---|
| 2002/0132720 A1* | 9/2002 | Cutler et al. | 501/103 |
| 2003/0024219 A1 | 2/2003 | Harada et al. | |
| 2004/0053781 A1* | 3/2004 | Okawara | 502/304 |
| 2004/0131512 A1* | 7/2004 | Abe et al. | 422/180 |
| 2004/0166035 A1 | 8/2004 | Noda et al. | |
| 2006/0014636 A1 | 1/2006 | Ichikawa et al. | |

FOREIGN PATENT DOCUMENTS

| | | |
|---|---|---|
| EP | 1 298 112 A1 | 4/2003 |
| EP | 1 723 998 A1 | 11/2006 |
| JP | A-9-94434 | 4/1997 |
| JP | A-9-173866 | 7/1997 |
| JP | A-2001-269585 | 10/2001 |
| JP | A-2002-276338 | 9/2002 |
| JP | A-2003-033664 | 2/2003 |

(Continued)

OTHER PUBLICATIONS

Dec. 27, 2011 European Search Report issued in EP06797228.1.

*Primary Examiner* — Jerry Lorengo
*Assistant Examiner* — Pritesh Darji
(74) *Attorney, Agent, or Firm* — Oliff & Berridge, PLC

(57) ABSTRACT

According to the present invention, there is provided a honeycomb catalytic structure comprising:
a honeycomb structure comprising porous partition walls having a large number of pores, disposed so as to form a plurality of cells extending between the two end faces of the honeycomb structure and plugging portions disposed at either one end of each cell, and
a catalyst layer containing a catalyst, supported at least on the inner surfaces of the pores of the honeycomb structure,
wherein the mass of the catalyst layer per unit volume (1 $cm^3$) of the honeycomb structure ($g/cm^3$) is 60% or less of the volume of pores per unit volume (1 $cm^3$) of the honeycomb structure ($cm^3/cm^3$).

8 Claims, 4 Drawing Sheets

FOREIGN PATENT DOCUMENTS

| | | |
|---|---|---|
| JP | A-2003-210922 | 7/2003 |
| JP | A-2004-16931 | 1/2004 |
| JP | A-2004-105792 | 4/2004 |
| JP | A-2004-167440 | 6/2004 |
| JP | A-2005-171805 | 6/2005 |
| JP | A-2006-051475 | 2/2006 |
| WO | WO 2005/075053 A1 | 8/2005 |
| WO | WO 2007026844 A1 * | 3/2007 |

* cited by examiner

HONEYCOMB CATALYTIC STRUCTURE, PRECOATED SUPPORT FOR PRODUCING HONEYCOMB CATALYTIC STRUCTURE, AND PROCESS FOR PRODUCING HONEYCOMB CATALYTIC STRUCTURE

TECHNICAL FIELD

The present invention relates to a honeycomb catalytic structure which is suitably used for purification of to-be-purified components such as carbon monoxide (CO), hydrocarbons (HC), nitrogen oxides (NOx), sulfur oxides (SOx) and the like, contained in exhaust gases emitted from automobiles engines, construction equipments engines, and stationary engines for industries as well as combustion equipment, etc.; a precoated support for producing the above honeycomb catalytic structure; and a process for producing the above honeycomb catalytic structure.

BACKGROUND ART

Currently, catalytic material of honeycomb structure (honeycomb catalytic structure) is in use in order to purify the exhaust gases emitted from kinds of engines, etc. This honeycomb catalytic structure has a constitution in which a catalyst layer 15 is loaded on the surfaces of the partition walls 4 which form cells 3 as shown in FIG. 6. Further, as shown in FIGS. 4 and 5, the purification of exhaust gas with such a honeycomb catalytic structure 60 (a honeycomb catalytic structure 11) is conducted by introducing an exhaust gas into the cells 3 of the honeycomb catalytic structure 60 from one end face 9a side of the structure to contact the exhaust gas with the catalyst layer (not shown) loaded on the surfaces of the partition walls 4 and then discharging the exhaust gas outside from other end face 2b side (see, for example, Patent Document 1 and Patent Document 2).

Also, as a diesel particulate filter (DPF) for capturing fine particles contained in an exhaust gas of diesel engine, there is in wide use a wall-flow type filter obtained by plugging either one end of each cell of a honeycomb structure such as mentioned above so that the cell ends at each end face of the honeycomb structure are plugged alternately ordinarily, each end face of the honeycomb structure looks checkerwise after plugging) and thereby allowing the exhaust gas introduced from one end face side to pass through the porous partition walls having function as a filtering layer and discharge outside from other end face side (see, for example, Patent Document 3).

Recently, the present Inventors have made a study in order to apply the above-mentioned wall-flow type structure of DPF to the above-mentioned honeycomb catalytic structure. In this study, it was attempted to conduct the above-mentioned cell plugging like DPF to a honeycomb catalytic structure such as mentioned above so that an exhaust gas can pass through the porous partition walls having a large number of pores and contact the exhaust gas with the catalyst layer loaded on the inner surfaces of partition wail pores to purify the exhaust gas during the passing-through.

In applying a wall-flow structure to the honeycomb catalytic structure, however, the amount of catalyst layer loaded on the inner surfaces of partition wall pores has a large influence on the properties of the honeycomb catalytic structure obtained. Therefore, the determination of the amount of catalyst layer to be loaded has been an important task to be solved. That is, formation of catalyst layer on the inner surfaces of pores results in smaller pores, which invites a serious increase in pressure loss when the amount of catalyst layer loaded is too large. Also, with smaller pores, the flow rate of exhaust gas passing through pores is higher. When the flow rate of exhaust gas is too high, the efficiency of contact between catalyst layer and exhaust gas is lower and no sufficient purification ability is obtained. Meanwhile, in a case where the amount of catalyst layer loaded is too small or introduction of catalyst particles which constitute the catalyst layer into pores is insufficient during the formation of catalyst layer and the catalyst layer is loaded only on the very small area of the inner surfaces of partition wall pores, the exhaust gas is unable to contact sufficiently with the catalyst layer during its passing through pores and no sufficient purification ability is obtained.

In such a honeycomb catalytic structure, the particle diameters of the catalyst particles used in formation of catalyst layer are also an important item to be investigated. Ordinarily, the formation of catalyst layer is conducted by suspension-loading a catalyst metal (erg. Pt) on the surfaces of particles of heat-resistant, inorganic oxide of high specific surface area, such as $\gamma Al_2O_3$ or perovskite or on the surfaces of particles of $CeO_2$, $ZrO_2$ or mixtures thereof having oxygen storability, to prepare catalyst particles, and adhering and loading them to or on the inner surfaces of pores, etc. of partition walls of a honeycomb structure which functions as a substrate of honeycomb catalytic structure. However, for example, when the particle diameters of catalyst particles are too large as compared with the diameters of pores, introduction of catalyst particles into pores during the formation of catalyst layer may be difficult, or an increase in pressure loss may be incurred by clogging of pores by catalyst particles.

Further, when a catalyst layer is loaded on a honeycomb catalytic structure, the catalyst layer tends to stagnate in the narrow portions of partition wall pores. In such portions where the catalyst layer is stagnant, the catalyst is adhered in a larger amount than in other portions but the effective utilization of most catalyst is not attained because the flow of exhaust gas is restricted. In the worst case of pore clogging by catalyst layer, not only the catalyst of clogged portions but also all the catalyst loaded on the inner surfaces of pores communicating with the clogged portions are not used for exhaust gas purification. Such a problem of low catalyst utilization occurs also in the catalyst introduced into the discontinuous pores not extending from one surface side of partition wall to other surface side or into very small pores. This problem is not preferred not only from the standpoint of catalytic activity blut also from the standpoint of effective utilization of noble metal used as a catalyst, and further invites a disadvantage of a rise in pressure loss, of whole honeycomb catalytic structure.

Patent Document 1: JP-A-2003-33664
Patent Document 2: JP-A-2006-51475
Patent Document 3: JP-A-2001-269585

DISCLOSURE OF THE INVENTION

The present invention has been completed in view of the above-mentioned situation and aims at providing a honeycomb catalytic structure employing a wall-flow structure such as used in DPF, which is superior in pressure loss and efficiency of contact between catalyst layer and exhaust gas and wherein the introduction of catalyst particles into pores of partition wall in the formation of catalyst layer is easy.

According to the present invention, there is provided a honeycomb catalytic structure (a first honeycomb catalytic structure) comprising:

a honeycomb structure comprising porous partition walls having a large number of pores, disposed so as to form a plurality of cells extending between the two end faces of the honeycomb structure and plugging portions disposed at either one end of each cell, and a catalyst layer containing a catalyst, supported at least on the inner surfaces of the pores of the honeycomb structure, wherein the mass of the catalyst layer per unit volume (1 cm$^3$) of the honeycomb structure (g/cm$^3$) is 60% or less of the volume of pores per unit volume (1 cm$^3$) of the honeycomb structure (cm$^3$/cm$^3$).

According to the present invention, there is also provided a honeycomb catalytic structure (a second honeycomb catalytic structure) comprising:

a honeycomb structure comprising porous partition walls having a large number of pores, disposed so as to form a plurality of cells extending between the two end faces of the honeycomb structure and plugging portions disposed at either one end of each cell, and a catalyst layer containing a catalyst, supported at least on the inner surfaces of the pores of the honeycomb structure, wherein 20% or more of the inner surfaces of pores is in contact with the catalyst layer.

According to the present invention, there is further provided a honeycomb catalytic structure (a third honeycomb catalytic structure) comprising:

a honeycomb structure comprising porous partition walls having a large number of pores, disposed so as to form a plurality of cells extending between the two end faces of the honeycomb structure and plugging portions disposed at either one end of each cell, and a catalyst layer containing a catalyst, supported at least on the inner surfaces of the pores of the honeycomb structure, wherein the catalyst layer is made of particles and the 50% particle diameter ($D_{50}$) of the particles is 70% or less of the average pore diameter of the pores.

According to the present invention, there is furthermore provided a honeycomb catalytic structure (a fourth honeycomb catalytic structure) comprising:

a honeycomb structure comprising porous partition walls having a large number of pores, disposed so as to form a plurality of cells extending between the two end faces of the honeycomb structure and plugging portions disposed at either one end of each cell, and a catalyst layer containing a catalyst, supported at least on the inner surfaces of the pores of the honeycomb structure, wherein the catalyst layer is made of particles and the 90% particle diameter ($D_{90}$) of the particles is 100% or less of the average pore diameter of the pores.

According to the present invention, there is furthermore provided a precoated support obtained by coating at least part of the inner surfaces of the pores of a honeycomb structure with a substance containing no noble metal, which honeycomb structure comprises porous partition walls having a large number of pores, disposed so as to form a plurality of cells extending between the two end faces of the honeycomb structure and plugging portions disposed at either one end of each cell.

According to the present invention, there is furthermore provided a honeycomb catalytic structure (a fifth honeycomb catalytic structure) comprising the above-mentioned precoated support and a catalyst layer containing a catalyst, supported on the precoated support.

According to the present invention, there is furthermore provided a process for producing a honeycomb catalytic structure, which comprises coating at least part of the inner surfaces of the pores of the honeycomb structure with a substance containing no noble metal which honeycomb structure comprises porous partition walls having a large number of pores, disposed so as to form a plurality of cells extending between the two end faces of the honeycomb structure and plugging portions disposed at either one end of each cell to obtain a precoated support and then loading on the precoated support a catalyst layer containing a catalyst.

In the first and second honeycomb catalytic structures of the present invention, the amount of catalyst layer supported is specified at an appropriate level; thereby, there can be appropriately suppressed the increase in pressure loss caused by the catalyst layer loaded on the inner surfaces of partition wall pores and the increase in the flow rate of the exhaust gas passing through pores and good catalytic activity can be obtained in the third and fourth honeycomb catalytic structures of the present invention, the 50% particle diameter ($D_{50}$) and 90% particle diameter ($D_{90}$) of the particles (catalyst particles) forming the catalyst layer are each specified at an appropriate level; thereby, the introduction of catalyst particles into pores of partition wall during the formation of catalyst layer can be made easy and the increase in pressure loss caused by the catalyst layer loaded on the inner surfaces of partition wall pores can be suppressed. When the precoated support of the present invention is used for production of a honeycomb catalytic structure, there can be lessened the stagnation of catalyst layer in the narrow pore portions of partition wall as well as in the discontinuous pores or very small pores of partition wall. In the fifth honeycomb catalytic structure of the present invention which is produced using the precoated support of the present invention, the stagnation of catalyst layer in the narrow pore portions of partition wall as well as in the discontinuous pores or very small pores of partition wall is lessened; therefore, good catalytic activity can be obtained and the noble metal used as a catalyst can be utilized effectively. In the process for producing a honeycomb catalytic structure of the present invention, the fifth honeycomb catalytic structure of the present invention can be produced easily.

EXPLANATION OF SYMBOLS 1 is a honeycomb catalytic structure; 2a and 2b are each ends face; 3 is a cell; 4 is a partition wall; 5 is a catalyst layer; 10 is a plugging portion; 11 is a honeycomb structure; 15 is a catalyst layer; 25 is a pore; 60 is a honeycomb catalytic structure; and T is a partition wall thickness.

BEST MODE FOR CARRYING OUT THE INVENTION

The best mode for carrying out the present invention is described below. However, the present invention is not restricted to the following embodiments and it should be construed that even those embodiments obtained by adding appropriate changes, improvements, etc. to the following embodiments based on the ordinary knowledge of those skilled in the art so that there is no deviation from the scope of the present invention, fall in the range of the present invention.

Figure 1:
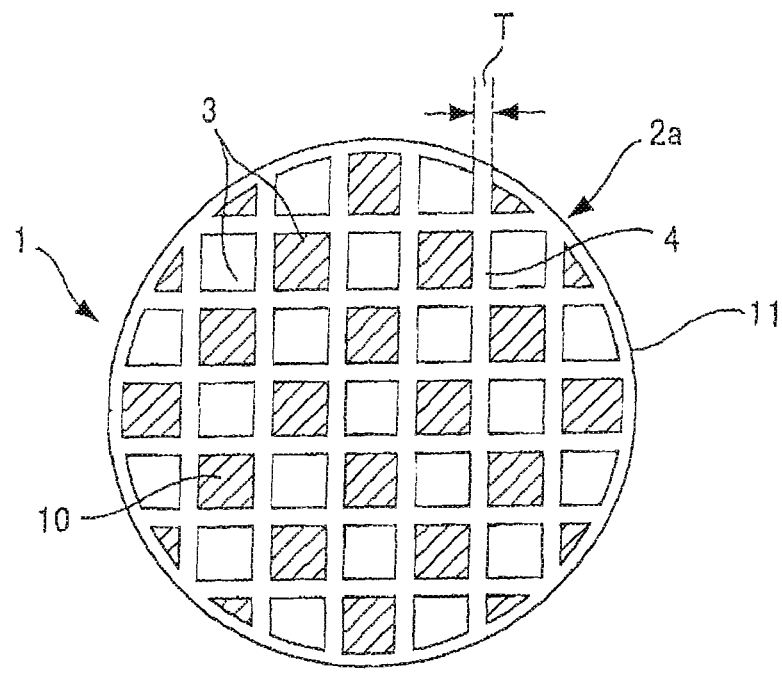
FIG. 1 is a front view schematically showing an embodiment of the honeycomb catalytic structure of the present invention.
Figure 2:
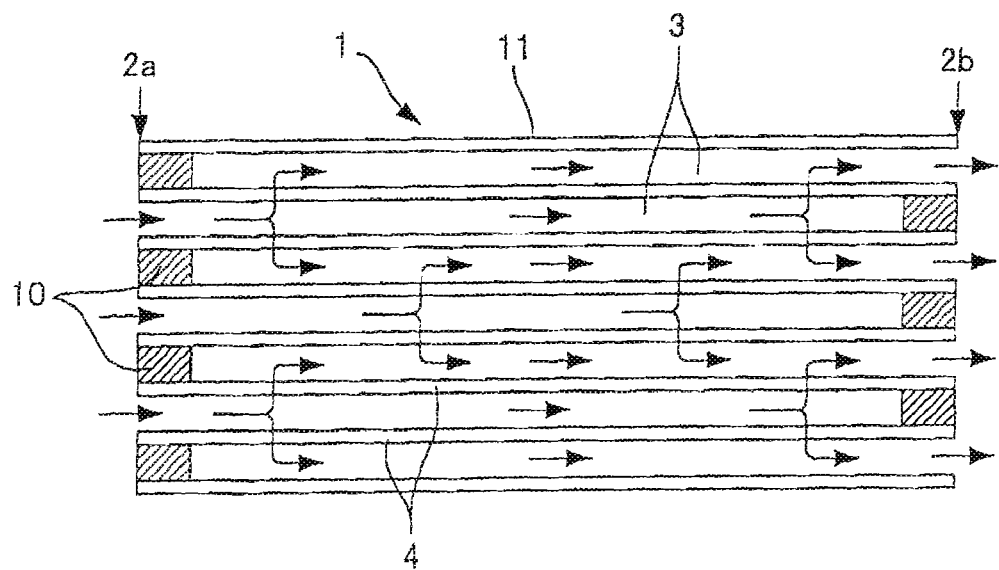
FIG. 2 is a sectional view schematically showing an embodiment of the honeycomb catalytic structure of the present invention.
Figure 3:
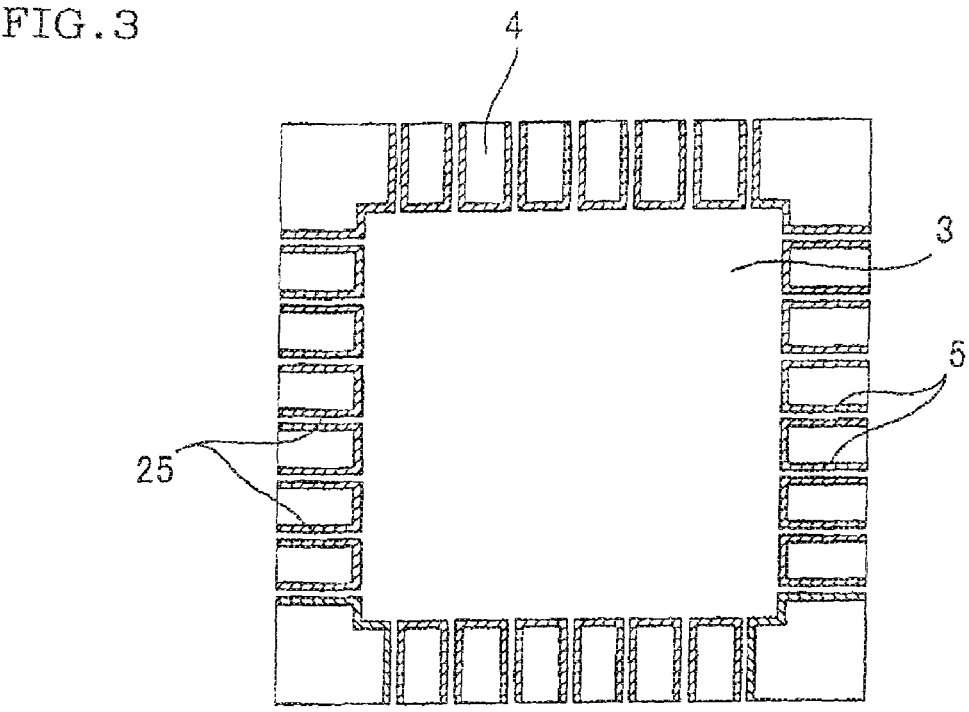
FIG. 3 is a partly enlarged view schematically showing an embodiment of the honeycomb catalytic structure of the present invention.
Figure 4:
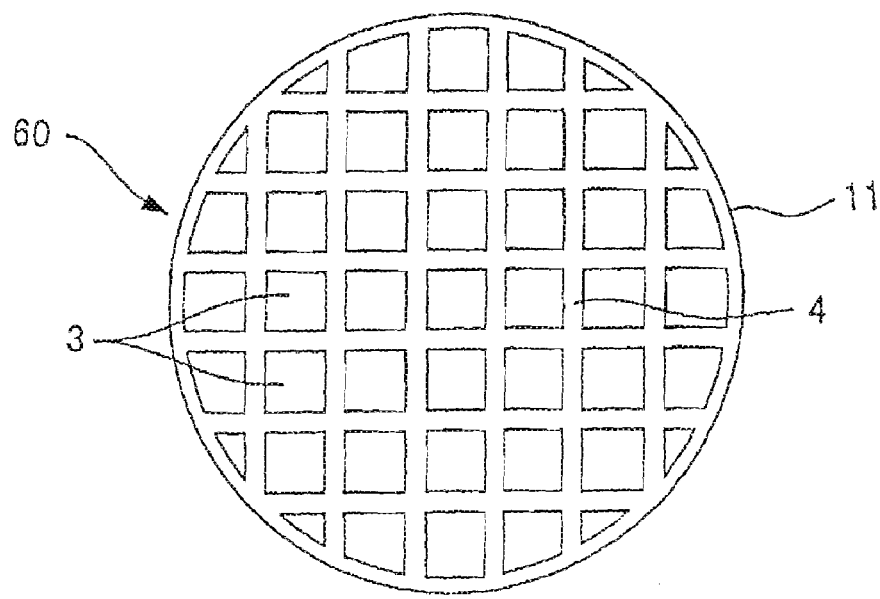
FIG. 4 is a front view schematically showing an embodiment of a conventional honeycomb catalytic structure.
Figure 5:
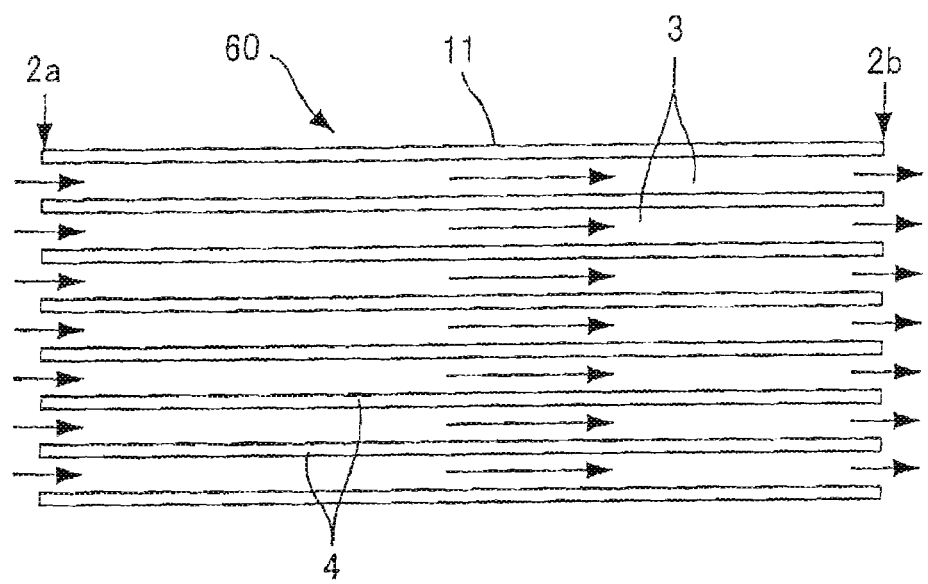
FIG. 5 is a sectional view schematically showing an embodiment of a conventional honeycomb catalytic structure.
Figure 6:
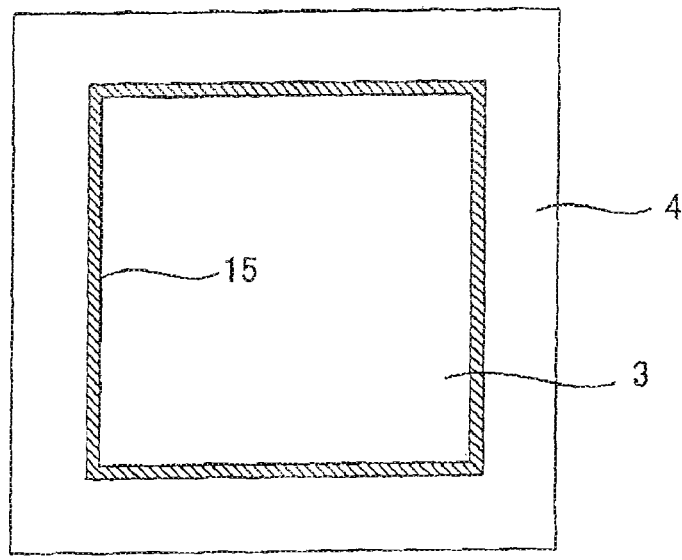
FIG. 6 is a partly enlarged view schematically showing an embodiment of a conventional honeycomb catalytic structure.

FIG. 1 is a front view schematically showing en embodiment of the honeycomb catalytic structure of the present invention; FIG. 2 is a sectional view schematically showing an embodiment of the honeycomb catalytic structure of the present invention; and FIG. 3 is a partly enlarged view schematically showing an embodiment of the honeycomb catalytic structure of the present invention. As shown in FIGS. 1 to 3, the honeycomb catalytic structure 1 of the present embodiment uses a honeycomb structure 11 comprising porous partition walls 4 which have a large number of pores 25 and plugging portions 10 as a substrate for supporting the catalyst layer. The partition walls 4 are disposed so as to form a plurality of cells 3 extending between the two end faces 2a and 2b of honeycomb structure. The plugging portions 10 are disposed so as to plug each cell 3 at either one end face 2a or 2b. The catalyst layer 5 is loaded at least on the inner surfaces of pores 25 in a layer form and ordinarily also on the inner surfaces of cells 3. The catalyst layer 5 contains a catalyst component such as noble metal or the like. Incidentally, when the diameters of pores are small, the catalyst layer may not be loaded on the inner surfaces of pores in a continuous state and may be loaded discontinuously in small lumps. However, the "catalyst layer" referred in the present invention includes even such discontinuous loading.

In such a honeycomb catalytic structure of wall-flow type, an exhaust gas enters cells 3 from one end face 2a side of the honeycomb catalytic structure 1, passes through porous partition walls 4 which function as a filtering layer and is discharged outside from other end face 2b side. During the passing through partition walls 4, the exhaust gas contacts with the catalyst layer loaded on the inner surfaces of pores 25 of partition walls 4, whereby the to-be-purified components (CO, HC, NOx, SOx, etc.) contained in the exhaust gas are purified.

The first honeycomb catalytic structure of the present invention has such a wall-flow type structure and its main feature is that the mass of the catalyst layer 5 per unit volume (1 cm$^3$) of the honeycomb structure 11 (g/cm$^3$) is 60% or less, preferably 40% or less, more preferably 20% or less of the volume of pores 25 per unit volume (1 cm$^3$) of the honeycomb structure 11 (cm$^3$/cm$^3$).

Incidentally, "the mass of the catalyst layer per unit volume (1 cm$^3$) of the honeycomb structure (g/cm$^3$)" and "the volume of pores per unit volume (g/cm$^3$) of the honeycomb structure (cm$^3$/cm$^3$)", both used in the above comparison are physical properties of different units. However, in the above comparison, the units of both properties are neglected. Further, the volume (unit volume) of the honeycomb structure is the volume of honeycomb structure excluding the plugging portions and the outer wall portions but including the hollow portions (cell inside and pore inside).

The present inventors made a study on the wall-flow type catalytic structure. As a result, it was found that, when loading of catalyst is made so that the mass of the catalyst layer per unit volume (1 cm$^3$) of the honeycomb structure (g/cm$^3$) is 60% or less of the volume of pores per unit volume (1 cm$^3$) of the honeycomb structure (cm$^3$/cm$^3$) as mentioned above, the increase in pressure loss caused by the loading of catalyst layer on the inner surfaces of partition wall pores and subsequent reduction in more diameter can be suppressed at an appropriate level and the catalytic structure obtained can keep an appropriate pressure loss. It was also found that the increase in flow rate of exhaust gas passing through pores caused by the above-mentioned reduction in pore diameter can be suppressed at an appropriate level, good contact efficiency between exhaust gas and catalyst layer can be obtained and, as a result, good catalytic activity can be obtained.

Incidentally, in the first honeycomb catalytic structure, no particular restriction is made to the lower limit of the mass of catalyst layer. However, when the amount of loading of catalyst layer is too small, sufficient purification ability is unlikely to be obtained. Therefore, the mass of the catalyst layer per unit volume (1 cm$^3$) of the honeycomb structure (g/cm$^3$) is preferably 5% or more, more preferably 10% or more of the volume of pores per unit volume (1 cm$^3$) of the honeycomb structure (cm$^3$/cm$^3$).

The second honeycomb catalytic structure of the present invention has as well the above-mentioned wall-flow type structure and its main feature is that 20% or more, preferably 30% or more, more preferably 40% or more of the inner surfaces of partition walls pores is in contact with the catalyst layer.

Incidentally, in the second honeycomb catalytic structure, the expression "x % or more of the inner surfaces of partition wall pores is in contact with the catalyst layer" has the following implication. That is, first, a SEM photograph of the section of partition wall is taken and observed for at least five (5) visual fields each having a size of length×width=T×T (T is the thickness of partition wall). This observation is conducted for three (3) portions of honeycomb catalytic structure, that is, the gas inlet side end portion (excluding plugging portions), the central portion in lengthwise direction, and the gas outlet side end portion (excluding plugging portions) (at least 15 visual fields are observed). Then, in each visual field observed, there are measured the length L of partition wall portion corresponding to pore surface and the length L' of partition wall portion contacting with catalyst layer, which is part of L. In this case, no consideration is made to partition wall portions other than inside pores, for example, the surfaces of partition wail. Using the L and L' measured, (L'/L)× 100 was calculated and, when the average of these values obtained for all visual fields was x or more, it was interpreted as "x % or more of the inner surfaces of partition wall pores is in contact with the catalyst layer". Incidentally, in the measurements of L and L', there was used a commercial image analysis soft [Paint Shop ProX (trade name) produced by COREL]. Any magnification of the SEM photograph may be used for the measurement as long as a clear image is obtained and any magnification of, for example, 10 to 1,000 may be selected. In the present patent application, an image of 50 magnifications was used.

The present inventors made a study on the wall-flow type catalytic structure. As result, it was found that, when loading of catalyst is conducted as mentioned above so that 20% or more of the inner surfaces of partition wall pores is in contact with the catalyst layer, the exposed surfaces of partition wail pores (that is, the pore inner surface portions having no catalyst loaded thereon) are smaller, good contact efficiency between exhaust gas and catalyst layer is obtained, resultantly good catalytic activity is obtained.

Incidentally, contact of 30% or more of the inner surfaces of partition wall pores with catalyst layer is preferred because efficient catalytic activity can be maintained even after the catalyst deterioration due to use. Contact of 95% or more of the inner surfaces of partition wall pores with catalyst layer tends to cause the above-mentioned problems of pore diameter reduction or pore clogging and subsequent increase in pressure loss. Therefore, the contact area is preferred to be kept at 95% or less. Contact of about 40% to 80% of the inner surfaces of partition wall pores with catalyst layer is appropriate in view of the good balance between them.

The third honeycomb catalytic structure of the present invention has as well the above-mentioned wall-flow type structure and its main feature's that the catalyst layer 5 is made of particles and the 50% particle diameter ($D_{50}$) of the particles is 70% or less, preferably 50% or less, more preferably 30% or less of the average pore diameter of the pores 25.

Incidentally, there was used, for measurement of particle diameter, a laser diffraction/scattering type particle diameter distribution tester, LA-910 produced by HORIBA, Ltd.

The present inventors made a study on the wall-flow type catalytic structure. As a result, it was found that, when the 50% particle diameter ($D_{50}$) of the catalyst layer 5—constituting particles (the catalyst particles) is 70% or less of the average pore diameter of the pores 25 as mentioned above, the introduction of catalyst particles into pores 25 for formation of catalyst layer 5 on the inner surfaces of pores 25 is easy. It was also found that, by restricting the 50% particle diameter ($D_{50}$) of the catalyst particles as above, the pores 25 are unlikely to be clogged by the catalyst particles and the increase in pressure loss can be suppressed. Incidentally, a case of a certain average pore diameter and a wide pore diameter distribution, as compared with a case of the same average pore diameter but a narrow pore diameter distribution, contains pores of smaller diameters. However, introduction of catalyst particles even into such pores of smaller diameters is made easy by making smaller the 50% particle diameter ($D_{50}$) of catalyst particles, i.e. 50% or less or 300 or less of the average pore diameter of pores.

In the third honeycomb catalytic structure, there is no particular restriction as to the lower limit of the 50% particle diameter ($D_{50}$) of catalyst particles. However, when the 50% particle diameter ($D_{50}$) is too small, a dense catalyst layer is formed, which may hinder the diffusion of exhaust gas into catalyst layer inside during the use of the catalytic structure. Therefore, the 50% particle diameter ($D_{50}$) of catalyst particles is preferred to be 3% or more of the average pore diameter of pores.

The fourth honeycomb catalytic structure of the present invention has as well the above-mentioned wall-flow type structure and its main feature is that the catalyst layer 5 is made of particles and the 90% particle diameter ($D_{90}$) of the particles is 100% or less, preferably 70% or less, more preferably 50% or less of the average pore diameter of the pores 25.

The present inventors made a study on the wall-flow type catalytic structure. As a result, it was found that, when the 90% particle diameter ($D_{90}$) of the catalyst layer 5—constituting particles (the catalyst particles) is 100% or less of the average pore diameter of the pores 25 as mentioned above, the introduction of catalyst particles into pores 25 for formation of catalyst layer 5 on the inner surfaces of pores 25 is easy. It was also found that, by restricting the 90% particle diameter ($D_{90}$) of the catalyst particles as above, the pores 25 are unlikely to be clogged by the catalyst particles and the increase in pressure loss can be suppressed. Incidentally, a case of a certain average pore diameter and a wide pore diameter distribution, as compared with a case of the same average pore diameter but a narrow pore diameter distribution, contains pores of smaller diameters. In this case, introduction of catalyst particles even into such pores of smaller diameters is made easy by making smaller the 90% particle diameter ($D_{90}$) of catalyst particles, i.e. 70% or less or 50% or less of the average pore diameter of pores.

In the fourth honeycomb catalytic structure, there is no particular restriction as to the lower limit of the 90% particle diameter ($D_{90}$) of catalyst particles. However, when the 90% particle diameter ($D_{90}$) is too small, a dense catalyst layer is formed, which may hinder the diffusion of exhaust gas into catalyst layer inside during the use of the catalytic structure. Therefore, the 90% particle diameter ($D_{90}$) of catalyst particles is preferred to be 5% or more of the average pore diameter of pores.

The precoated support of the present invention is used for producing a honeycomb catalytic structure by loading a catalyst layer on the precoated support. It is obtained by coating at least part of the inner surfaces of the pores of a honeycomb structure with a substance containing no noble metal (the substance is hereinafter referred to as "precoating material"), which honeycomb structure comprises porous partition walls having a large number of pores, disposed so as to form a plurality of cells extending between the two end faces of the honeycomb structure and plugging portions disposed at either one end of each cell.

The precoating material may be an organic material or an inorganic material as long as it contains no noble metal such as Pt, Pd, Rh or the like. By coating at least part of the inner surfaces of pores with the precoating material, the stagnation of catalyst layer in narrow portions of partition wall pores or in discontinuous pores and very small pores can be lessened during the formation of catalyst layer, good catalytic activity is obtained, and effective utilization of noble metal used as a catalyst becomes possible.

When an organic material is used as the precoating material, the material is preferably removable by combustion or gasification when a heat treatment has been applied after loading of catalyst layer on precoated support. In this case, since an exhaust gas flows through the voids formed by combustion or gasification, the contact efficiency between exhaust gas and catalyst can be increased, a reduction in pressure loss can be obtained, and the increase in heat capacity can be prevented.

Particularly preferred organic material can be removed by combustion or gasification at an ordinary firing temperature employed for solid adhesion of catalyst layer to honeycomb structure. When the organic material is not burnt or gasified at such an ordinary firing temperature, it can be used without removal by combustion or gasification or can be heat-treated for removal by combustion or gasification at a temperature higher than the ordinary firing temperature. In the latter case, however, it is important that the firing temperature is in a range where no catalyst deterioration takes place. As specific examples of the organic material usable as the precoating material, there can be mentioned a polymer, carbon, an oil, a fat or the like. The polymer may be a natural polymer or a synthetic polymer. There can be preferably used a polymer which is easily dissolved or dispersed highly in an ordinary solvent such as water, alcohol or the like; for example, polyvinyl alcohol (PVA), carboxymethyl cellulose (CMC) or acrylic polymer. The molecular weight of the polymer is preferably 500,000 or less in view of its solubility in water. Further, the polymer is preferably solidified at an ordinary drying temperature which is set depending upon the solvent used (the drying temperature is about 100 to 200° C. in the case of water). The coating of the inner surfaces of pores with the organic material can be conducted, for example, by immersing a honeycomb structure in a liquid (a precoating fluid) in which the organic material is dissolved or dispersed.

When an inorganic material's used as the precoating material, there is no particular restriction as to the inorganic material as long as it has per se sufficient heat resistance after firing. However, it is preferred to hardly impair the heat resistance or thermal shock resistance of honeycomb structure. Use of, for example, the same material as the honeycomb structure on which a precoating material is to be coated, is preferred from the standpoint of thermal shock resistance because the coating material and the honeycomb structure show the same thermal expansion. As a preferred embodiment, there can be mentioned, for example, precoating of a cordierite fine powder on a cordierite-based honeycomb structure. The inorganic material is unable to be removed by combustion or gasification by a heat treatment unlike the above-mentioned organic material. Therefore the stagnation of catalyst layer in narrow portions of pores is hardly lessened. However, penetration of catalyst layer into discontinuous pores or very small pores can be prevented effectively. Further, when the inorganic material is used, as compared with when there is used the organic material removable by combustion or gasification, adhesivity can be maintained between the catalyst layer (which is loaded on the inorganic material) and the support (honeycomb structure). Incidentally, when the inorganic material used is likely to dissolve in the catalyst slurry used in the subsequent step of loading (forming) a catalyst layer, it is possible to, for example, apply a heat treatment to the precoated support prior to the step of catalyst layer loading, to suppress the dissolution of the inorganic material. As specific examples of the inorganic material usable as the precoating material, there can be mentioned a silica sol, an alumina sol, a catalyst slurry containing no noble metal, a slurry of a powder which is the same material as the support, and a slurry containing inorganic material particles. The coating of the inner surfaces of pores with the organic material can be conducted, for example, by immersing a honeycomb structure in such a sol or slurry.

In the precoated support of the present invention, the pore volume (pore volume before the coating of the precoating material) per unit mass of honeycomb structure is reduced by the precoating material coated on the inner surfaces of pores, preferably by 1.5 to 30%, more preferably by 2 to 25%, further preferably by 3 to 20%. When the reduction is less than 1.5%, the coating of narrow portions of pores or coating of very small pores may be insufficient; when the reduction is more than 30%, pores are filled excessively with the precoating material alone and the room for loading the catalyst is greatly restricted, and the pressure loss may increase beyond the allowable limit. Incidentally, the reduction in pore volume can be determined by measuring the pore volumes per unit mass of honeycomb structure before and after the coating of the precoating material using a mercury porosimeter and then making a calculation using the measured values.

Also, in the precoated support of the present invention, the mass of the precoating material per unit volume (1 cm$^3$) of the honeycomb structure (g/cm$^3$) is preferably 0.4 to 12%, more preferably 1.5 to 7%, further preferably 2 to 4% of the volume of pores per unit volume (1 cm$^3$) of the honeycomb structure (cm$^3$/cm$^3$). When the mass is less than 0.4%, the coating of narrow portions of pores or coating of very small pores may be insufficient; when the mass is more than 12%, pores are filled excessively with the precoating material alone and the room for loading the catalyst is greatly restricted, and the pressure loss may increase beyond the allowable limit.

Incidentally, "the mass of the precoating material per unit volume (1 cm$^3$) of the honeycomb structure (g/cm$^3$)" and "the volume of pores per unit volume (1 cm$^3$) of the honeycomb structure (cm$^3$/cm$^3$)", both used in the above comparison are physical properties of different units; however, in the above comparison, the units of both properties are neglected. Further, the volume (unit volume) of the honeycomb structure the volume of honeycomb structure excluding the plugging portions and the outer wall portions but including the hollow portions (cell inside and pore inside).

Further, in the precoated support of the present invention, the mass of the precoating material per unit volume (1 cm$^3$) of the honeycomb structure (g/cm$^3$) is preferably 1.5 times or less, more preferably 1.2 times or less, further preferably 0.7 time or less of the reciprocal ($\mu m^{-1}$) of the average pore diameter ($\mu m$) of the honeycomb structure. When the mass is more than 1.5 times, the amount of the precoating material is excessive for the average pore diameter and the risk of pore clogging by excessive precoating material in loading of catalyst layer is higher, and the pressure loss may increase beyond the allowable limit.

Incidentally, "the mass of the precoating material per unit volume (1 cm$^3$) of the honeycomb structure (g/cm$^3$)" and "the reciprocal of the average pore diameter ($\mu m$) of the honeycomb structure ($\mu m^{-1}$)", both used in the above comparison are physical properties of different units. However, in the above comparison, the units of both properties are neglected. Further, the volume (unit volume) of the honeycomb structure is the volume of honeycomb structure excluding the plugging portions and the outer wall portions but including the hollow portions (cell inside and pore inside).

The fifth honeycomb catalytic structure of the present invention is a honeycomb catalytic structure obtained by loading a catalyst layer containing a catalyst on the above-mentioned precoated support of the present invention. This honeycomb catalytic structure is produced using the precoated support of the present invention. Therefore, in the honeycomb catalytic structure, the stagnation of catalyst layer in the narrow portions of partition wall, pores or in discontinuous pores and very small pores is lessened, good catalytic activity is obtained, and the effective utilization of noble metal used as a catalyst can be achieved.

In the fifth honeycomb catalytic structure of the present invention, the mass ratio of catalyst layer to precoating material of precoated support (mass of catalyst layer/mass of precoating material) is preferably 2 to 30, more preferably 2.5 to 20. When the mass ratio is less than 2, the mass of the catalyst layer relative to the mass of the precoating material is too small and it may be difficult to obtain appropriate adhesion of catalyst layer to pore surface. When the mass ratio is more than 30, the coating of pore narrow portions or very small pores with precoating material is insufficient and the stagnation of catalyst layer in such sites may occur.

To the fifth honeycomb catalytic structure of the present invention wherein a catalyst layer has been loaded on a precoated support, a heat treatment may be applied in order to solidly adhere the catalyst layer to the precoated support or to remove the precoating material of precoated support by combustion or gasification. However, in the stage of a dried honeycomb catalytic structure before application of such a heat treatment, the total pore volume of honeycomb structure (the volume before coating of precoating material and catalyst layer) is reduced by the precoating material and catalyst layer coated on the inner surfaces of pores, preferably by 10 to 60%, more preferably by 20 to 50%. When the reduction is less than 10%, both the precoating material and the catalyst layer may be unable to exhibit respective roles sufficiently; when the reduction is more than 60%, the pressure loss may increase beyond the allowable limit.

When part or the whole of the precoating material remains without being removed by combustion or gasification in the fired honeycomb catalytic structure after the above-mentioned heat treatment, the total pore volume of honeycomb structure the volume before coating of precoating material and catalyst layer) is reduced by the precoating material and catalyst layer coated on the inner surfaces of pores, preferably by 10 to 60%, more preferably by 20 to 50%. When the reduction is less than 10%, both the precoating material and the catalyst layer may be unable to exhibit respective roles sufficiently; when the reduction is more than 60%, the pressure loss may increase beyond the allowable limit.

When no precoating material remains by removal by combustion or gasification in the fired honeycomb catalytic structure after the above-mentioned heat treatment, the total pore volume of honeycombs structure (the volume before coating of precoating material and catalyst layer) is reduced by the precoating material and catalyst layer coated on the inner surfaces of pores, preferably by 5 to 5-0%, more preferably by 10 to 35%. When the reduction is less than 5%, the catalyst layer may be unable to exhibit its role sufficiently; when the reduction is more than 50%, the pressure loss may increase beyond the allowable limit.

In the present invention, the density of cells 3 (cell density) of the honeycomb structure 11 is preferably 0.25 to 62 cells/$cm^2$ (1.61 to 400 cpsi), more preferably 1.55 to cells/$cm^2$ (10 to 300 cpsi), particularly preferably 1.55 to 31 cells/$cm^2$ (10 to 200 cpsi). When the cell density is less than 0.25 cells/$cm^2$, the contact efficiency with exhaust gas tends to be insufficient. Meanwhile, when the cell density is more than 62 cells/$cm^2$, the pressure loss tends to increase. Incidentally, "cpsi" is the abbreviation of cells per square inch and is a unit indicating the number of cells per square inch. 10 cpsi is about 1.55 cells/$cm^2$.

The thickness of partition wall 4 (partition wall thickness T) is preferably 0.15 to 7 film (6 to 280 mil), more preferably 0.25 to 2 mm (10 to 80 mil), particularly preferably 0.38 to 1.5 mm (15 to 60 mil). When the partition wall thickness T is less than 0.15 mm, the strength may be insufficient and the thermal shock resistance may be low. Meanwhile, when the partition wall thickness T is more than 7 mm, the pressure loss may increase. Incidentally, 1 mil is $1/1,000$ inch and is about 0.025 mm.

The average pore diameter of partition wall 4 is preferably 10 to 3,000 μm, more preferably 20 to 500 μm, particularly preferably 30 to 200 μm. When the average pore diameter is less than 10 μm, the above-mentioned pore diameter reduction or pore clogging tends to occur in loading of catalyst layer. When the average pore diameter of partition wall 4 is 50 μm or more, the pressure loss is greatly lessened; when the average pore diameter is 60 μm or more, fine particles, for example, carbon fine particles contained in the exhaust gas emitted from diesel engine are captured hardly and the increase in pressure loss during the use of honeycomb structure is alleviated. Meanwhile, when the average pore diameter is more than 3,000 μm, it tends to be difficult to sufficiently secure the contact area between exhaust gas and catalyst layer formed on the inner surfaces of pores. Incidentally, the "pore diameter" referred in the present specification is a physical property measured by image analysis. Specifically explaining, a SEM photograph is taken for the section of partition wall and, in this photograph, at least 20 visual fields of length×width=T×T (m is the thickness of partition wall) are observed. Then, the maximum linear distance of pore is measured in each visual field, and the average of the maximum linear distances measured for all the visual fields is calculated and it was taken as "average pore diameter". In the image analysis, there was used a commercial image analysis soft [Paint Shop ProX (trade name) produced by COREL]. Any magnification of the SEM photograph may be used for the measurement as long as a clear image is obtained and any magnification of for example, 10 to 1,000 may be selected. In the present patent application, an image of 50 magnifications was used.

The porosity of partition wall 4 is preferably 30 to 80%, more preferably 40 to 65%. When the porosity is less than 30%, the flow rate of exhaust gas passing through partition walls increases and the purification ability tends to decrease. Meanwhile, when the porosity is more than 80%, the strength tends to be insufficient. Incidentally, the "porosity" referred in the present invention is a physical property measured by image analysis. Specifically explaining, a SEM photograph of the section of partition wall is taken and, in the photograph, at least five (5) visual fields each of length×width=T×T (T is the thickness of partition wall) are observed. In each visual field observed, the ratio of the area of voids is determined and the three-second power of the ratio is calculated. The average of the three-second powers of all the visual fields is calculated and it was taken as "porosity". In the image analysis, there was used a commercial image analysis soft [Paint Shop ProX (trade name) produced by COREL]. Any magnification of the SEM photograph may be used for the measurement as long as a clear image is obtained and any magnification of, for example, 10 to 1,000 may be selected. In the present patent application, an image of 50 magnifications was used.

The standard deviation of common logarithm of pore distribution of partition wall 4, i.e. the pore distribution a of partition wall 4 is preferably 0.1 to 0.6, more preferably 0.2 to 0.6. When the pore distribution σ is less than 0.1, the pressure loss in the passing of gas through partition walls tends to increase. Meanwhile, when the pore distribution σ is more than 0.6, the exhaust gas flows through large pores alone and the purification ability tends to decrease.

When the cell density is to cells/$cm^2$, the thickness of partition wall is to 7 mm, the average pore diameter of partition wall is 40 to 3,000 μm, the porosity of partition wall is 30 to 80%, and the standard deviation of common logarithm of pore distribution of partition wall is to 0.6, it is suited as a support which constitutes an industrial catalytic structure used for purification of the exhaust gas emitted from industrial combustion equipment.

When the cell density is to cells/$cm^2$, the thickness of partition wall is to 1.5 mm, the average pore diameter of partition wall is more than 40 μm but 500 μm or less, the porosity of partition wall is 40 to 65%, and the standard deviation of common logarithm of pore distribution of partition wall is to 0.6, it is suited as a support which constitutes an industrial catalytic structure, particularly, a catalytic structure for vehicle, used for purification of the exhaust gas emitted from automobile engine.

The permeability of partition wall 4 of honeycomb structure 11 is preferably $7 \times 10^{-12}$ to $4 \times 10^{-8}$ $m^2$, more preferably $1 \times 10^{-11}$ to $8 \times 10^{-10}$ $m^2$, particularly preferably $3 \times 10^{-11}$ to $3 \times 10^{-10}$ $m^2$. When the permeability of partition wall 4 is in the above range and when a catalyst layer 5 is loaded on such a honeycomb structure 1 to obtain a honeycomb catalytic structure 1, the carbon particles, etc. contained in the exhaust gas emitted from diesel engine are hardly captured by the partition walls 4 and most of them pass therethrough. Therefore, with such a honeycomb catalytic structure 11, there can be obtained a honeycomb catalytic structure 1 wherein the pressure loss is small and the increase in pressure loss is unlikely to take place even in long-term use.

Incidentally, the "permeability" referred here denotes a physical property value calculated from the following formula (1), and is an index representing the flow resistance of gas when an intended gas flows through an object (partition walls). In the formula (1), C is permeability (m$^2$), F is flow rate (cm$^3$/s) of gas, T is sample thickness (cm), V is gas viscosity (dynes·sec/cm$^2$) D is sample diameter (cm), and P is gas pressure (PSI). In the formula (1), 13.839 (PSI)=1 (atom), and (dynes·sec/m$^2$)=1 (PSI).

$$C=[8FTV/(\pi D^2(P^2-13.839^2)/13.839\times 68947.6)]\times 10^{-4} \quad (1)$$

Figure 7:
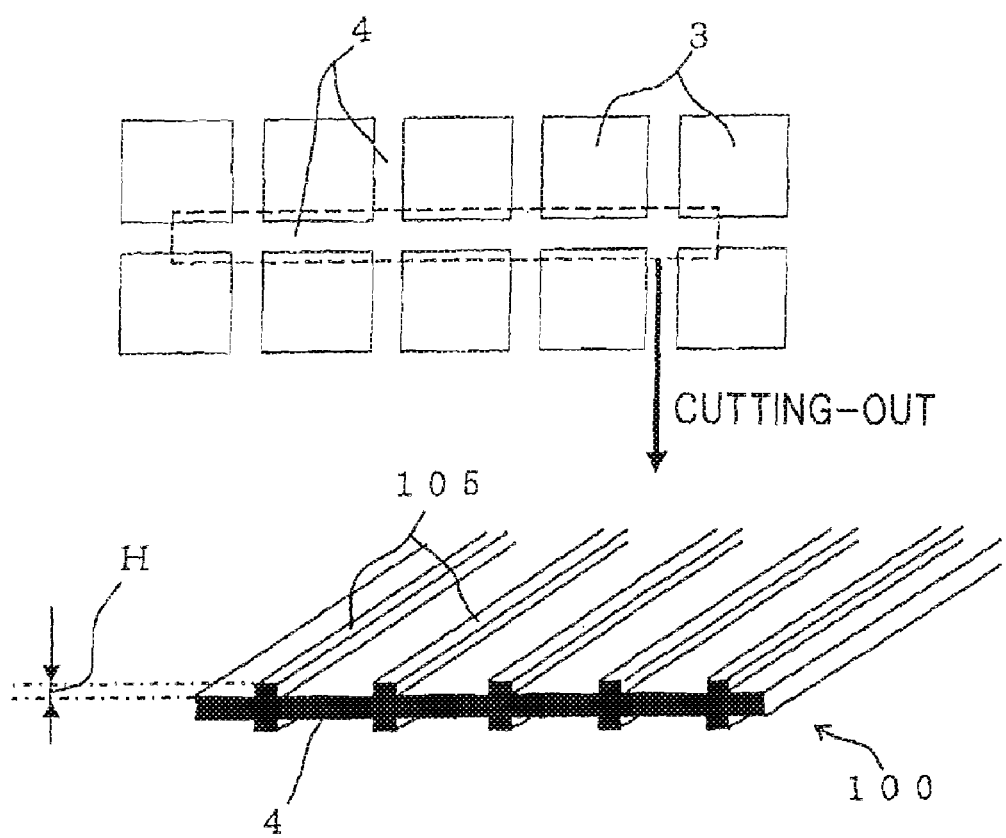
FIG. 7 is a schematic drawing explaining the test piece used in measurement of permeability.

FIG. 7 is a schematic drawing explaining the test piece used in measurement of permeability. As shown in FIG. 7, first, one partition wall 4 is cut out as a test piece 100 from a honeycomb structure or a honeycomb catalytic structure in a state that part of each partition wall intersecting the one partition wall 4 remains as a rib residue 105 at, each side of the one partition wall 4 in a rib residue thickness H of 0.2 mm. The shape of the test piece 100 may be a square plate or a circular plate. Air of room temperature is passed through the test piece 100 and its permeability is calculated using the above-mentioned formula (1). Use of a fluid seal (e.g. grease) is desired so that there is no leakage of air from the gap between the test: piece and the seal, formed by the rib residue 105. The flow amount of air is controlled so that the calculated flow rate of air passing through the partition wall becomes 0.1 to 1 cm/sec, and the result measured with this air flow amount is used. Incidentally, when the permeability is measured for the partition wall of honeycomb catalytic structure, the state of catalyst layer loading differs between the inner wall surface of cell and the cut surface. However, in the honeycomb catalytic structure of the present invention, the catalyst layer is loaded on the inner surface of each pore of partition wall; therefore, the influence of rib residue is small and the permeability of partition wall of honeycomb catalytic structure can be measured by the same method as for honeycomb structure.

In the honeycomb structure 11, the hydraulic diameter D (m) of cell and the permeability (m$^2$) of partition wall 4 are preferred to satisfy a relation of (cell hydraulic diameter)$^2$/(permeability)=2×10$^3$ to less than 6×10$^5$, are more preferred to satisfy a relation of (cell hydraulic diameter)$^2$/(permeability)=5×10$^3$ to 1×10$^5$ and are particularly preferred to satisfy a relation of (cell hydraulic diameter)$^2$/(permeability) 1×10$^4$ to 5×10$^4$.

The pressure loss appearing when a gas flows through cells (pressure loss in through-cell flow) is inversely proportional to the second power of the hydraulic diameter of cell. Also, the ratio of the pressure loss appearing when a gas passes through partition walls (pressure loss in through-partition-wall passage) and the pressure loss in through-cell low, i.e. [(pressure loss in through-partition-wall passage)/(pressure loss in through-cell flow)] is proportional to [(cell hydraulic diameter)$^2$/(permeability)]. Here, when the [(cell hydraulic diameter)$^2$/(permeability)] is 2×10$^3$ or more, it is preferred because a gas easily flows uniformly over the entire range of partition wall 4 of the honeycomb catalytic structure 1 obtained with such a honeycomb structure 11. Meanwhile, when the [(cell hydraulic diameter)$^2$/(permeability)] is less than 6×10$^5$, it is preferred because the honeycomb catalytic structure 1 obtained with such a honeycomb structure 11 hardly shows an increase in pressure loss, as a whole.

As the material which constitutes the honeycomb structure 11, there can be mentioned, as preferred examples, a material composed mainly of a ceramic, and a sintered metal. When the honeycomb structure 11 is made of a material composed mainly of a ceramic, there can be mentioned, as preferred examples of the ceramic, silicon carbide, cordierite, alumina titanate, sialon, mullite, silicon nitride, zirconium phosphate, zirconia, titania, alumina, silica, and combinations thereof. Particularly preferred ceramics are silicon carbide, cordierite, mullite, silicon nitride, alumina, etc. for their resistances to alkali. Of these, oxide type ceramics are preferred for the cost.

In the honeycomb structure 11 of the present embodiment, the thermal expansion coefficient in cell-extending direction at 40 to 800° C. is preferably less than 1×10$^{-6}$/° C., more preferably less than 0.8×10$^{-6}$/° C., particularly preferably less than 0.5×10$^{-6}$/° C. When the thermal expansion coefficient in cell-extending direction at 40 to 800° C. is less than 1.0×10$^{-6}$/° C., the thermal stress generating when the honeycomb structure has been exposed to an exhaust gas of high temperature can be suppressed in an allowable range and the honeycomb structure can be protected from thermal stress-destruction.

The sectional shape of the honeycomb structure 11 obtained when the structure 11 has been cut perpendicularly to the cell-extending direction in the diameter direction is preferred to fit the inner shape of the exhaust gas system in which the structure is to be mounted. As specific sectional shapes, there can be mentioned a circle, an oval, an ellipse, a trapezoid, a triangle, a square, a hexagon and a special shape which is asymmetric at the right and the left. Of these, preferred are a circle, an oval and an ellipse.

The honeycomb structure used in the present invention can be produced, for example, by a process which is based on the known process for production of diesel particulate filter (DPF).

The permeability of partition wall 4 of the honeycomb catalytic structure 1 of the present invention is preferably 6.8×10$^{-12}$ to 3×10$^{-8}$ m$^2$, more preferably 8×10$^{-12}$ to 6×10$^{-10}$ m$^2$, particularly preferably 2×10$^{-11}$ to 2×10$^{-10}$ m$^2$. When the permeability of partition wall 4 is less than 6.8×10$^{-12}$ m$^2$ the pressure loss is large and tends to increase easily in long-term use. Meanwhile, when the permeability of partition wall 4 is more than 3×10$^{-8}$ m$^2$, it tends to be difficult to secure the sufficient contact area between exhaust gas and catalyst layer 5.

In the honeycomb catalytic structure 1, the hydraulic diameter D (m) of cell and the permeability (m$^2$) of partition wall 4 are preferred to satisfy a relation of (cell hydraulic diameter)$^2$/(permeability)=2×10$^3$ or more, are more preferred to satisfy a relation of (cell hydraulic diameter)$^2$/(permeability)=5×10$^3$ to 1×10$^5$, and are particularly preferred to satisfy a relation of (cell hydraulic diameter)$^2$/(permeability)=1×10$^4$ to 5×10$^4$. When the [(cell hydraulic diameter)$^2$/(permeability)] is 2×10$^3$ or more, this is preferred because a gas easily flows uniformly over the entire range of partition wall 4. Meanwhile, when the [(cell hydraulic diameter)$^2$/(permeability)] is less than 6×10$^5$, this is preferred because the honeycomb catalytic structure 1 hardly shows an increase in pressure loss, as a whole.

In the present invention, the average pore diameter of partition wall 4 in a state that a catalyst layer 5 has been loaded, is preferably 10 to 2,000 μm, more preferably 20 to 300 μm, particularly preferably 30 to 100 μm. When the average pore diameter is less than 10 μm, fine particles, for example, the carbon fine particles contained in the exhaust gas emitted from diesel engine are captured easily and an increase in pressure loss tends to take place. Meanwhile, when the average pore diameter is more than 2,000 μm, it tends to be difficult to secure the sufficient contact area between exhaust gas and the catalyst layer formed on the inner surfaces of pores.

The porosity of partition wall 4 in a state that a catalyst layer 5 has been loaded, is preferably 30 to 80%, more preferably 40 to 70%. When the porosity is less than 30%, the flow rate of exhaust gas passing through partition walls increases and the purification ability tends to decrease. Meanwhile, when the porosity is more than 80%, the strength tends to be insufficient.

Incidentally, when the average pore diameter is 10 to 2,000 μm and the porosity is 30 to 80% in a state that a catalyst layer 5 has been loaded, such a honeycomb catalytic structure is suitable as an industrial catalytic structure used for purification of the exhaust gas emitted from industrial combustion equipment. When the average pore diameter is 30 μm or more, preferably more than 50 μm but not more than 500 μm and the porosity is 40 to 70%, such a honeycomb catalytic structure is suitable as an industrial catalytic structure, particularly as a catalytic structure for vehicle, used for purification of the exhaust gas emitted from automobile engine.

In the first to fourth honeycomb catalytic structures of the present invention, the amount of catalyst layer loaded per unit volume of honeycomb structure is preferably 10 to 250 g/liter, more preferably 10 to 150 g/liter. When the amount is less than 10 g/liter, sufficient catalytic activity is unlikely to be obtained; when the amount is more than 250 g/liter, the pressure loss is too large. In the fifth honeycomb catalytic structure of the present invention, produced with the precoated support of the present invention, the amount of catalyst layer loaded per unit volume of honeycomb structure is preferably 10 to 200 g/liter, more preferably 20 to 130 g/liter. When the amount is less than 10 g/liter, sufficient catalytic activity is unlikely to be obtained; when the amount is more than 200 g/liter, it is difficult to avoid the pore clogging caused by the catalyst layer even when the amount of precoating material coated has been restricted.

The catalyst layer may be loaded also on portions other than the inner surfaces of pores of partition wall, for example, on the surface of each partition wall and plugging portions. Thereby, the catalytic activity can be enhanced and the loading of catalyst layer becomes easy. Meanwhile, when the catalyst layer is loaded mainly on the inner surfaces of pores of partition wall and its loading on partition wall surface and plugging portion is minimized, it is preferred from the standpoint of pressure loss. The thickness of the catalyst layer loaded on the inner surfaces of pores of partition wall is preferably 50 μm or less for suppression of pressure loss. A thickness of 20 μm or less is more preferred because the catalyst layer can be easily utilized even to the inner deep portion.

The amount of catalyst layer loaded per unit volume of honeycomb structure need not be uniform in the whole honeycomb catalytic structure. In the honeycomb catalytic structure, it is generally preferred from the standpoint of catalytic ability that the catalyst is present in a larger amount in the vicinity of the inlet side end face with which an exhaust gas first comes into contact. Therefore, for example, the amount of catalyst layer loaded per unit volume of honeycomb structure is made larger by 5% or more in the vicinity of one end face (inlet side end face) of honeycomb structure than in the vicinity of other end face (outlet side end face). Also, an exhaust gas tends to flow in a larger amount right after each plugging portion or right before each plugging portion. Therefore, when plugging portions are provided at the two ends of cells, it is also preferred that the amount of catalyst layer loaded per unit volume of honeycomb structure is made larger by 5% or more in the vicinities of the two end faces of honeycomb structure than in its central portion of lengthwise direction for the catalyst is allowed to be present in a larger amount right after each plugging portion or right before each plugging portion to improve purification ability. By doing so, the pressure loss increases and the flow amount of exhaust gas decreases at the portion(s) of higher catalyst loading amount and resultantly the flow amount of exhaust gas increases at other portions small in flow amount of exhaust gas. Accordingly, the balance of flow amount of exhaust gas becomes good in the whole honeycomb catalytic structure and the whole partition walls can be utilized effectively.

When the amount of catalyst layer loaded per unit volume of honeycomb structure is allowed to differ between the vicinity of one end face and the vicinity of other end face of honeycomb structure, the difference may be a stepwise difference in the lengthwise direction of honeycomb structure or the amount of loading may gradually increase from one end face of honeycomb structure toward other end face.

As the catalyst contained in the catalyst layer 5 which constitutes the honeycomb catalytic structure 1, a noble metal is preferably used, for example, when the structure is used for purification of exhaust gas of automobile. As preferred examples of the noble metal, there can be mentioned Pt, Rh, Pd and combinations thereof. The total amount of noble metal is preferably to 7.07 g per liter of the volume of honeycomb structure.

The noble metal is ordinarily coated on the inner surfaces of pores, etc. of honeycomb structure in a state that it is dispersed in and loaded on the particles of heat-resistant inorganic oxide. As the heat-resistant inorganic oxide, $\gamma Al_2O_3$ is used generally. However, $\theta Al_2O_3$, $\delta Al_2O_3$, $\alpha Al_2O_3$ or the like may be used. Use of an oxide having a perovskite structure, particularly one containing a noble metal is a preferred embodiment from the standpoint of heat resistance. The noble metal may be fixed onto a co-catalyst such as $CeO_2$, $ZrO_2$ or the like and then coated on a honeycomb structure. When an $Al_2O_3$ such as mentioned above is used, it is also preferred to add a rare earth metal, $SiO_2$ or the like thereto for increase in heat resistance.

As the $Al_2O_3$, there can also be preferably used an $Al_2O_3$ gel (xerogel, aerogel, cryogel or the like) produced by the sol-gel method. In this case, catalyst components (noble metal, $CeO_2$, $ZrO_2$, etc.) may be allowed to be present in the gel, in the step of gel production. Alternatively, after the gel production, the catalyst components may be loaded on the gel. When there is a step in which an $Al_2O_3$ gel comes into contact with a liquid such as water or the like in production of a honeycomb catalytic structure, a cryogel having water resistance is used preferably.

It is also possible to load a noble metal directly on a honeycomb structure for suppression of increase in pressure loss. In this case, there may be applied to the honeycomb structure a pretreatment, for example, a surface modification typified by an acid treatment or an alkali treatment so that the noble metal can be fixed easily.

The first to fourth honeycomb catalytic structures of the present invention can be produced by loading A catalyst on the above-mentioned honeycomb structure according to a method which is based on a known method. Specifically explaining, first, a catalyst slurry containing a catalyst is prepared. Then, the catalyst slurry is coated on the inner surfaces of partition wall pores of honeycomb structure by suction or the like. Then, the slurry-coated honeycomb structure is dried at room temperature or with heating, whereby the first to fourth honeycomb catalytic structures can be produced. When an organic material is beforehand mixed into the catalyst slurry, the organic material in the catalyst layer is removed by combustion, enabling formation of exhaust gas passages, even if there have occurred catalyst stagnation in narrow portions of pores and resultant pore clogging by catalyst during catalyst loading.

The fifth honeycomb catalytic structure of the present invention can be produced by coating at least part of the inner surfaces of pores of the above-mentioned honeycomb structure with a precoating material to obtain a precoated support and then loading on the precoated support a catalyst layer containing a catalyst. Specifically explaining, a honeycomb structure is, for example, immersed in a liquid (a precoating fluid) in which a precoating material is dissolved or dispersed to coat at least part of the inner surfaces of pores of the honeycomb structure with the precoating material to obtain a precoated support. Here, when a required coating amount is not obtained in one-time coating operation (for example, one-time immersion), the coating operation is repeated few to several times until the required coating amount is obtained. Then, a catalyst slurry containing a catalyst is prepared and the precoated support is, for example, immersed in the catalyst slurry to coat the catalyst slurry on the inner surfaces of partition wall pores of honeycomb structure. Thereafter, the slurry-coated precoated support is dried at room temperature or with heating and, as necessary, a heat treatment is applied, whereby the fifth honeycomb catalytic structure of the present invention can be produced, incidentally, in a separate product ion process, a precoating fluid or a catalyst slurry is allowed to flow into a honeycomb structure at its one end face side and discharge from the other end face side. In this case, use of pressure at flow-into side or use of vacuum at discharging side is preferred because the passing of precoating fluid or catalyst slurry through partition walls is easy.

Incidentally, in the precoating fluid, the viscosity thereof is preferred to be lower than the viscosity of the catalyst slurry because the precoating fluid can penetrate into fine pores easily. The specific viscosity of the precoating fluid is preferably 0.8 to 40 mPa·s, more preferably 5 to 30 mPa·s. When the viscosity of the precoating fluid is less than 0.8 mPa·s, the fluid has too high a fluidity and effective filling of fine pores may be impossible. Meanwhile, when the viscosity is more than 40 mPa·s, penetration of the fluid into fine pores may be difficult. When the penetration into fine pores is secured and there is used a precoating fluid having a viscosity as high as possible, a required coating amount is obtained in a coating operation of less times.

Coating of the precoating fluid under vacuum for sufficient penetration thereof into fine pores is one preferred embodiment. As to the method for evacuation, there is no particular restriction as long as a minus pressure can be achieved in contact of a honeycomb structure with the precoating fluid. For example, it is possible that the honeycomb structure is immersed in the precoating fluid and the whole system is placed in a vacuum chamber for evacuation, or that while the precoating fluid is allowed to flow into the honeycomb structure from its one end face side as mentioned above, evacuation is made from other end face side to allow the precoating fluid to pass through the honeycomb structure. When the precoating fluid is coated under vacuum, sufficient penetration thereof into fine pores is possible even when the viscosity of the precoating fluid is the same as or higher than the viscosity of the catalyst slurry.

When the precoating fluid is a slurry, i.e. a slurry containing particles, the particle size of the particles contained in the slurry is preferably 5 nm to 10 μm, more preferably 10 nm to 5 μm. When the particle size is less than 5 nm, coagulation between particles tends to occur; when the particle size is more than 10 μm, penetration of particles into narrow portions of pores or into fine pores may be insufficient.

The honeycomb catalytic structure of the present invention can be used not only as a catalytic structure for purification of the exhaust gas emitted from industrial (stationary) combustion equipment, etc. but also as a catalytic structure for vehicle mounting, for purification of the exhaust gas emitted from engine. However, it is particularly suited for mounting on vehicle in which compactness and low pressure loss are strongly required for the catalytic structure. When the present honeycomb catalytic structure is used for vehicle mounting, it can be used not only in gasoline vehicles but also in diesel vehicles. However, it can be preferably used in gasoline vehicles in order to avoid the increase in pressure loss caused by deposition of fine particles. It can be preferably used also in diesel vehicles when a mean for removing the deposit of fine particles is mounted in combination. The present honeycomb catalytic structure can also be preferably used, for example, as a catalytic structure which is installed downstream of a filter (e.g. a DPF, intended for removal of fine particles from a dust-containing gas, in order to purify the exhaust gas in which fine particles have been removed by the above filter. The present honeycomb catalytic structure may also be used by being installed downstream of other catalytic structure which is different from the present honeycomb catalytic structure. For example, it is a preferred embodiment to use the present honeycomb catalytic structure for purification of exhaust gas emitted from automobile by installing, at an upstream side, an ordinary honeycomb catalytic structure superior in warm-up property and installing, at a downstream side, the present honeycomb catalytic structure which is good at contact efficiency between exhaust gas and catalyst layer and which is superior in purification ability. In this case, it is possible to install the two catalytic structures continuously in close contact or to separately install them by installing the former right after engine and the latter below floor.

EXAMPLES

The present invention is described in more detail below by way of Examples. However, the present invention is in no way restricted to these Examples.

Examples 1 to 22, Comparative Examples 1-3

As the honeycomb structures for loading a catalyst layer thereon, there were prepared those each made of a material shown in Table 1 and having a cell structure, an average pore diameter and a permeability, shown in Table 1 (in Table 1, however, permeability data were shown only for representative Examples and Comparative Examples). The measurement methods for average pore diameter and permeability are described later. As to the external size of honeycomb structure, there were prepared two kinds for each Example and each Comparative Example, that is, a honeycomb structure of 5.66 in. (diameter)×6 in. (length) and a honeycomb structure of 1 in. (diameter)×2 in. (length). The former was named "honeycomb structure A" and the latter was named "honeycomb structure B". Incidentally, in these honeycomb structures, each cell was plugged at either one end so that the cell ends were plugged alternately at each end face of honeycomb structure and that each end face of honeycomb structure looked checkerwise.

For these honeycomb structures, pore volume per unit volume was measured before loading of catalyst layer according to a method described later. Further, for each honeycomb structure A before loading of catalyst layer, pressure loss was measured using an initial pressure loss tester.

A dinitrodiammineplatinum solution and water were added to a powder consisting of 70 parts by mass of a $\gamma Al_2O_3$, 20 parts by mass of a $CeO_2$ powder and 10 parts by mass of a $ZrO_2$ powder. The mixture was subjected to wet-disintegration to prepare a catalyst slurry to be used for formation of catalyst layer. In this catalyst slurry were dipped each honeycomb structure A and each honeycomb structure B to load a catalyst layer on the inner surfaces of cells and inner surfaces of partition wall pores of honeycomb structure. Each honeycomb structure loaded with the catalyst layer was dried with heating to obtain honeycomb catalytic structures.

Incidentally, the amount of catalyst layer loaded was controlled at a level shown in Table 1. Also, the amount of platinum (Pt) of catalyst layer loaded per unit volume of honeycomb structure was made constant ($0.00035$ g/cm$^3$, in all cases except Examples 17 and 18, by controlling the addition amount of dinitrodiammineplatinum in the stage of catalyst slurry preparation.

In Example 17, the amount of Pt of catalyst layer loaded per unit volume of honeycomb structure was different between the portion of honeycomb structure from upstream side end face to the ½ length of total length (upstream portion) and the portion of honeycomb structure from downstream side end face to the ½ length of total length (downstream portion) in the lengthwise direction of the honeycomb structure (upstream portion: $0.0048$ g/cm$^3$, downstream portion: $0.00024$ g/cm$^3$).

In Example 18, the amount of catalyst layer loaded per unit volume of honeycomb structure was different as shown in Table 1 in the portion of honeycomb structure from upstream side end face to the ¼ length of total length (upstream portion) and the portion of honeycomb structure from downstream side end face to the ¼ length of total length (downstream portion) and in the residual portion (central portion) excluding the upstream and downstream portions in the lengthwise direction of the honeycomb structure. Also, the amount of Pt of catalyst layer loaded per unit volume of honeycomb structure was different correspondingly to the amount of catalyst layer loaded (upstream portion and downstream portion: $0.00048$ g/cm$^3$, central portion: $0.00024$ g/cm$^3$).

Of the thus-produced honeycomb catalytic structures, those each produced using a honeycomb structure A were measured for contact ratio between pore inner surface and catalyst layer according to a method described later, and the results are shown in Table 1. Also, these honeycomb catalytic structures were measured for increase in pressure loss caused by loading of catalyst layer, long-term resistance to clogging, and increase in pressure loss in long-term use according to respective methods described later and the results are shown in Table 2. Of the above-produced honeycomb catalytic structures, those each produced using a honeycomb structure B were measured for catalytic activity according to a method described later and the results are shown in Table 2. Incidentally, the long-term resistance to clogging and the increase in, pressure loss in long-term use were measured only for representative Examples and representative comparative Examples.

[Average Pore Diameter]

A SEM photograph of the section of partition wall was taken. In this photograph, at least 20 visual fields each of length×width=T×T (T is the thickness of partition wall) were observed. Then, in each visual field observed, the maximum liner distance of voids was measured and the average of these distances of all the visual fields was calculated and taken as "average pore diameter".

[Permeabillty]

Part of partition wall was cut out and processed so as to remove the surface unevenness to prepare a sample; the sample was held between two sample holders of 20 mm ir in diameter (the holders were put on and beneath the sample) so that there was no gas leakage. Then, a gas was allowed to permeate the sample at a particular pressure so that the pressure downstream of the sample became 1 atm. In this case, the gas which permeated the sample was calculated for permeability based on the following formula (1). Incidentally, in the following formula (1), C is a permeability (m$^2$); F is a gas flow rate (cm$^3$/s) T is a sample thickness (cm); V is a gas viscosity (dynes·sec/cm$^2$); D is a sample diameter (cm); and P is a gas pressure (PSI). In the following formula (1), $13.839$ (PSI)=1 (atm.) and $68947.6$ ((dynes·sec/cm$^2$)=1 (PSI). Incidentally, in the measurement, there was used as the tester Capillary Flow Pormeter Model 1100 AEX (trade name) produced by Porous Materials, Inc.

$$C=[8FTV/(\pi D^2(P^2-13.839^2)/13.839\times 68947.6)]\times 10^{-4} \qquad (1)$$

[Pore Volume Per Unit Volume of Honeycomb Structure]

The pore volume (cm$^3$/g) of honeycomb structure (excluding plugged portions) was measured using a mercury porosimeter and it was multiplied by the bulk density (g/cm$^3$) of honeycomb structure to calculate the pore volume per unit volume of honeycomb structure (cm$^3$/cm$^3$).

[Contact Ratio between Pore Inner Surface and Catalyst]

First, a SEM photograph of the section of partition wall was taken and observed for at least five (5) visual fields each having a size of length×width=T×T (T was the thickness of partition wall). This observation was conducted for three (3) portions of honeycomb catalytic structure, that is, the gas inlet side end portion (excluding plugging portions), the central portion in lengthwise direction, and the gas outlet side end portion (excluding plugging portions) at least 15 visual fields were observed). Then, in each visual field observed, there were measured the length L of partition wall portion corresponding to pore surface and the length L' of partition wall portion contacting with catalyst layer, which was part of L. Using the L and L' measured, (L'/L)×100 was calculated and the average of such values for all visual fields was calculated and taken as "contact ratio between pore inner surface and catalyst".

[Increase in Pressure Loss, Caused by Loading of Catalyst Layer]

The pressure loss of honeycomb structure after loading of catalyst layer was measured using a tester for initial pressure loss. From this measurement result and the pressure loss of honeycomb structure before loading of catalyst layer which had been measured beforehand, the increase ratio in pressure loss, caused by loading of catalyst layer was calculated. The result obtained was shown as relative comparative index.

[Long-Term Resistance to Clogging]

A fuel obtained by adding 5 parts by mass of a commercial engine oil to 95 parts by mass of a fuel gas oil for gas oil burner was allowed to burn under a lean condition in a state that no soot was generated. The combustion gas generated was allowed to flow into a honeycomb catalytic structure at 600° C. at a flow rate of 2.1 Nm/min for 30 days. "Long-term resistance to plugging" was rated based on the following standard.

○: No problem and good.

Δ: Slight clogging but actual use is possible.

x: Actual use is impossible owing to clogging.

[Increase in Pressure Loss in Long-Term Use]

A fuel obtained by adding 5 parts by mass of a commercial engine oil to 95 parts by mass of a fuel gas oil for gas oil burner was allowed to burn under a lean condition in a state that no soot was generated. The combustion gas generated was allowed to flow into a honeycomb catalytic structure at 600° C. at a flow rate of 2.1 Nm/min for 33 days to carry out a long-term durability test. Then, the pressure loss of honeycomb structure after long-term durability test was measured using an initial pressure loss tester. From this pressure loss and the pressure loss of honeycomb structure before loading of catalyst layer which had been measured beforehand, the increase ratio in pressure loss caused by loading of catalyst layer and long-term use was calculated. The result obtained was shown as relative comparative index.

[Catalytic Activity]

A synthetic gas ($C_3H_6$: 500 ppm, $O_2$: 1%, $N_2$: residue) was passed through a honeycomb catalytic structure at a space velocity (SV) of 50,000 $hr^{-1}$ and a gas temperature of 400° C., and the difference in $C_3H_6$ concentration between the inlet side before passing-through a honeycomb catalytic structure and the outlet side after passing-through a honeycomb catalytic structure was examined. The result was shown as relative comparative index.

TABLE 2

|  | Increase in pressure loss, caused by loading of catalyst layer *1 | Catalytic activity *2 | Long-term resistance to clogging | Increase in pressure loss, caused by long-term use *3 |
|---|---|---|---|---|
| Ex. 1 | 4 | 87 | — | — |
| Ex. 2 | 31 | 98 | ◯ | 3 |
| Ex. 3 | 7 | 79 | ◯ | 0 |
| Ex. 4 | 12 | 74 | ◯ | 1 |
| Ex. 5 | 10 | 86 | — | — |
| Ex. 6 | 15 | 75 | — | — |
| Ex. 7 | 17 | 63 | — | — |
| Ex. 8 | 22 | 69 | — | — |
| Ex. 9 | 29 | 86 | — | — |

TABLE 1

| | Material of honeycomb structure | Cell structure of honeycomb structure Partition wall thickness (mil)/cell density (cpsi) | Average pore diameter of honeycomb structure (μm) | Permeability Before loading of catalyst layer ($m^2$) | Permeability After loading of catalyst layer ($m^2$) | Pore volume per unit volume of honeycomb structure, $V_1$ ($cm^3/cm^3$) | Loaded amount of catalyst layer per unit volume of honeycomb structure, $W_1$ ($g/cm^3$) | $W_1/V_1 \times 100$ (%) | Contact ratio between pore inner surface and catalyst layer (%) |
|---|---|---|---|---|---|---|---|---|---|
| Ex. 1 | Cordierite *2 | 17/100 | 350 | — | — | 0.17 | 0.05 | 30 | 95 |
| Ex. 2 | Cordierite *2 | 17/100 | 300 | — | — | 0.17 | 0.1 | 60 | 99 |
| Ex. 3 | Cordierite *2 | 17/100 | 300 | — | — | 0.17 | 0.05 | 30 | 89 |
| Ex. 4 | Cordierite *1 | 17/100 | 150 | — | — | 0.23 | 0.05 | 22 | 86 |
| Ex. 5 | Cordierite *1 | 17/100 | 300 | — | — | 0.15 | 0.05 | 32 | 94 |
| Ex. 6 | Cordierite *1 | 12/200 | 100 | — | — | 0.15 | 0.05 | 32 | 85 |
| Ex. 7 | Cordierite *1 | 12/200 | 65 | — | — | 0.15 | 0.03 | 20 | 79 |
| Ex. 8 | Cordierite *1 | 12/200 | 55 | — | — | 0.15 | 0.03 | 20 | 70 |
| Ex. 9 | Cordierite *1 | 12/200 | 38 | — | — | 0.15 | 0.03 | 20 | 53 |
| Ex. 10 | Cordierite *1 | 12/200 | 26 | — | — | 0.15 | 0.03 | 20 | 45 |
| Ex. 11 | Cordierite *1 | 12/200 | 8 | $6.3 \times 10^{-12}$ | $5.5 \times 10^{-12}$ | 0.15 | 0.03 | 20 | 18 |
| Ex. 12 | Cordierite *1 | 12/200 | 15 | $8.0 \times 10^{-12}$ | $7.2 \times 10^{-12}$ | 0.15 | 0.03 | 20 | 39 |
| Comp. Ex. 1 | Cordierite *1 | 12/200 | 15 | $8.0 \times 10^{-12}$ | $4.3 \times 10^{-12}$ | 0.15 | 0.1 | 66 | 96 |
| Ex. 13 | Cordierite *1 | 12/200 | 15 | — | — | 0.15 | 0.05 | 33 | 51 |
| Ex. 14 | Cordierite *1 | 12/200 | 15 | — | — | 0.15 | 0.07 | 46 | 65 |
| Ex. 15 | Cordierite *1 | 12/200 | 15 | — | — | 0.18 | 0.05 | 28 | 48 |
| Comp. Ex. 2 | Cordierite *2 | 12/200 | 15 | $8.5 \times 10^{-12}$ | $5.0 \times 10^{-12}$ | 0.16 | 0.1 | 62 | 93 |
| Ex. 16 | Cordierite *2 | 12/200 | 8 | $6.9 \times 10^{-12}$ | $6.1 \times 10^{-12}$ | 0.16 | 0.03 | 19 | 16 |
| Ex. 17 | Cordierite *1 | 12/200 | 15 | — | — | 0.15 | Upstream portion: 0.03 Downstream portion: 0.03 | Upstream portion: 20 Downstream portion: 20 | Upstream portion: 39 Downstream portion: 39 |
| Ex. 18 | Cordierite *1 | 12/200 | 15 | — | — | 0.15 | Upstream and downstream portions: 0.04 Central portion: 0.02 | Upstream and downstream portions: 27 Central portion: 13 | Upstream and downstream portions: 46 Central portion: 32 |
| Ex. 19 | SiC | 12/300 | 20 | — | — | 0.20 | 0.03 | 15 | 37 |
| Ex. 20 | SiC | 12/300 | 20 | — | — | 0.19 | 0.05 | 26 | 54 |
| Comp. Ex. 3 | SiC | 12/200 | 20 | — | — | 0.16 | 0.1 | 62 | 98 |
| Ex. 21 | Aluminum titanate | 12/300 | 15 | — | — | 0.23 | 0.03 | 13 | 35 |
| Ex. 22 | Aluminum titanate | 12/300 | 15 | — | — | 0.23 | 0.05 | 21 | 46 |

*1: A low-porosity type

*2: A high-porosity type

TABLE 2-continued

| | Increase in pressure loss, caused by loading of catalyst layer *1 | Catalytic activity *2 | Long-term resistance to clogging | Increase in pressure loss, caused by long-term use *3 |
|---|---|---|---|---|
| Ex. 10 | 31 | 89 | — | — |
| Ex. 11 | 68 | 56 | Δ | 78 |
| Ex. 12 | 35 | 95 | ○ | 37 |
| Comp. Ex. 1 | 100 | 49 | X | 125 |
| Ex. 13 | 45 | 74 | — | — |
| Ex. 14 | 61 | 67 | — | — |
| Ex. 15 | 45 | 80 | — | — |
| Comp. Ex. 2 | 96 | 40 | X | 115 |
| Ex. 16 | 50 | 52 | Δ | 57 |
| Ex. 17 | 35 | 97 | — | — |
| Ex. 18 | 35 | 100 | — | — |
| Ex. 19 | 33 | 97 | — | — |
| Ex. 20 | 41 | 79 | — | — |
| Comp. Ex. 3 | 97 | 48 | — | — |
| Ex. 21 | 32 | 95 | — | — |
| Ex. 22 | 42 | 86 | — | — |

*1: Relative index,
*2: Relative index,
*3: Relative index

As shown in Table 2, the honeycomb catalytic structures of Examples 1 to 22 wherein the mass of catalyst layer per unit volume of honeycomb structure (g/cm$^3$) was 60% or less of the pore volume per unit volume of honeycomb structure (cm$^3$/cm$^3$), as compared with the honeycomb catalytic structures of Comparative Examples 1 to 3 wherein the mass of catalyst layer per unit volume of honeycomb structure (g/cm$^3$) was more than 60% of the pore volume per unit volume of honeycomb structure (cm$^3$/cm$^3$), were low in the increase in pressure loss caused by loading of catalyst layer and showed a higher catalytic activity (a higher purification ability). Examples 1 to 22, Examples 1 to 10, 12 to 15 and 17 to 22 wherein 20% or more of the inner surfaces of pores was in contact with the catalyst layer showed particularly good results. Example 12 wherein the permeability of partition wall before loading of catalyst layer was in a range of $7 \times 10^{-12}$ to $4 \times 10^{-8}$ m$^2$ and the permeability of partition wall after loading of catalyst layer was in a range of $6.8 \times 10^{-12}$ to $3 \times 10^{-8}$ m$^2$, as compared with Comparative Examples 1 and 2 wherein the permeability of partition wall after loading of catalyst layer was outside the above-mentioned range and Examples 11 and 16 wherein the permeabilities of partition wall before and after loading of catalyst layer were outside the above-mentioned ranges, hardly showed pore clogging and were low in the increase in pressure loss caused by pore clogging.

Examples 23 to 34, Comparative Examples 4 and 5

A dinitrodiammineplatinum solution and water were added to a powder consisting of 70 parts by mass of a $\gamma Al_2O_3$ powder, 20 parts by mass of a $CeO_2$ powder and 10 parts by mass of a $ZrO_2$ powder. The mixture was subjected to wet disintegration to prepare a catalyst slurry for formation of catalyst layer. Incidentally, the 50% particle diameter ($D_{50}$) and 90% particle diameter ($D_{90}$) of the particles (catalyst particles) contained in the catalyst slurry were adjusted to the levels shown in Table 3, by selecting the time length of wet disintegration from five (5) levels of 3 hours, 12 hours, 24 hours, 48 hours and 72 hours.

In the catalyst slurry was dipped a cordierite honeycomb structure A whose material, cell structure, average pore diameter and permeability were shown in Table 3, to load a catalyst layer on the inner surfaces of cells and partition wall cores of the honeycomb structure. The resulting honeycomb structure was dried with heating to obtain honeycomb catalytic structures. Incidentally, the amount of catalyst layer loaded per unit volume of honeycomb structure and the amount of Pt of catalyst layer loaded per unit volume of honeycomb structure were made constant (amount of catalyst layer loaded: 0.03 g/cm$^3$, amount of Pt loaded: 0.0035 g/cm$^3$) in all cases.

The thus-obtained honeycomb catalytic structures were measured for increase in pressure loss caused by loading of catalyst layer, long-term resistance to clogging and increase in pressure loss in long-term use according to the respective methods mentioned above. The results are shown in Table 4. Incidentally, the long-term resistance to clogging and the increase in pressure loss in long-term use were examined only for representative Examples and representative Comparative Examples.

TABLE 3

| | Material of honeycomb structure | Cell structure of honeycomb structure Partition wall thickness (mil)/cell density (cpi$^2$) | Average pore diameter of honeycomb structure, Da (μm) | Permeability Before loading of catalyst layer (m$^2$) | Permeability After loading of catalyst layer (m$^2$) | Wet grinding time of catalyst slurry (hrs) | 50% particle diameter of catalyst particles, D50 (μm) | 90% particle diameter of catalyst particles, D90 (μm) | (D50/Da) × 100 (%) | (D90/Da) × 100 (%) |
|---|---|---|---|---|---|---|---|---|---|---|
| Ex. 23 | Cordierite | 12/200 | 15 | — | — | 12 | 9.7 | 13.8 | 64.7 | 92.0 |
| Ex. 24 | Cordierite | 12/200 | 15 | — | — | 24 | 8.1 | 11 | 54.0 | 73.3 |
| Ex. 25 | Cordierite | 12/200 | 15 | — | — | 48 | 4.9 | 8.5 | 32.7 | 56.7 |
| Ex. 26 | Cordierite | 12/200 | 15 | $8.0 \times 10^{-12}$ | $7.2 \times 10^{-12}$ | 72 | 1.7 | 5.2 | 11.3 | 34.7 |
| Comp. Ex. 4 | Cordierite | 12/200 | 15 | $8.0 \times 10^{-12}$ | $5.6 \times 10^{-12}$ | 3 | 12.3 | 19.6 | 82.0 | 130.7 |
| Ex. 27 | Cordierite | 12/200 | 350 | — | — | 3 | 12.3 | 19.6 | 3.5 | 5.6 |
| Ex. 28 | Cordierite | 12/200 | 300 | — | — | 3 | 12.3 | 19.6 | 4.1 | 6.5 |
| Ex. 29 | Cordierite | 12/200 | 150 | — | — | 3 | 12.3 | 19.6 | 8.2 | 13.1 |
| Ex. 30 | Cordierite | 12/200 | 100 | — | — | 3 | 12.3 | 19.6 | 12.3 | 19.6 |
| Ex. 31 | Cordierite | 12/200 | 65 | $1.7 \times 10^{-11}$ | $1.6 \times 10^{-11}$ | 3 | 12.3 | 19.6 | 18.9 | 30.2 |
| Ex. 32 | Cordierite | 12/200 | 55 | — | — | 3 | 12.3 | 19.6 | 22.4 | 35.6 |
| Ex. 33 | Cordierite | 12/200 | 38 | — | — | 3 | 12.3 | 19.6 | 32.4 | 51.6 |
| Ex. 34 | Cordierite | 12/200 | 25 | — | — | 3 | 12.3 | 19.6 | 49.2 | 78.4 |
| Comp. Ex. 5 | Cordierite | 12/200 | 8 | $6.3 \times 10^{-12}$ | $4.0 \times 10^{-12}$ | 3 | 12.3 | 19.6 | 153.8 | 245.0 |

TABLE 4

| | Increase in pressure loss, Caused by loading of catalyst layer *1 | Long-term resistance to clogging | Increase in pressure loss in long-term use *2 |
|---|---|---|---|
| Ex. 23 | 56 | ○ | 43 |
| Ex. 24 | 44 | — | — |
| Ex. 25 | 29 | — | — |
| Ex. 26 | 23 | ○ | 26 |
| Comp. Ex. 4 | 100 | Δ | 122 |
| Ex. 27 | 2 | — | — |
| Ex. 28 | 2 | ○ | 0 |
| Ex. 29 | 5 | — | — |
| Ex. 30 | 10 | ○ | 7 |
| Ex. 31 | 15 | ○ | 16 |
| Ex. 32 | 22 | — | — |
| Ex. 33 | 28 | — | — |
| Ex. 34 | 44 | — | — |
| Comp. Ex. 5 | 160 | X | 193 |

*1: Relative index,
*2: Relative index

As shown in Table 4, the honeycomb catalytic structures of Examples 23 to 34 wherein the 50% particles diameter ($D_{50}$) of catalyst particles was 70% or less of the average pore diameter of pores or the 90% particles diameter ($D_{90}$) of catalyst particles was 1000% or less of the average pore diameter of pores, as compared with the honeycomb catalytic structures of Comparative Examples 4 and 5 wherein the 50% particles diameter ($D_{50}$) of catalyst particles was more than 70% of the average pore diameter of pores or the 90% particles diameter ($D_{90}$) of catalyst particles was more than 100% of the average pore diameter of pores, were low in the increase in pressure loss caused by loading of catalyst layer. Examples 26 and 31 wherein the permeability of partition wall before loading of catalyst layer was in a range of $7 \times 10^{-12}$ to $4 \times 10^{-8}$ m$^2$ and the permeability of partition wall after loading of catalyst layer was in a range of $6.8 \times 10^{12}$ to $3 \times 10^{-8}$ m$^2$, as compared with Comparative Example 4 wherein the permeability of partition wall after loading of catalyst layer was outside the above-mentioned range and Comparative Example 5 wherein the permeabilities of partition wall before and after loading of catalyst layer were outside the above-mentioned ranges, hardly showed pore clogging and were low in the increase in pressure loss caused by pore clogging.

Examples 35 to 56, Comparative Example 6

There were prepared honeycomb structures whose cell structure, pore volume and average pore diameter, etc. were shown in Tables 5 to 9. Their initial masses were measured. Then, these honeycomb structures (excluding that of Comparative Example 6) were immersed in either of precoating fluids A to D for 1 hour, at room temperature, at normal pressure or under vacuum of 0.05 MPa (absolute pressure). Incidentally, in the tables, pore volume and average pore diameter of honeycomb structure were measured by a mercury porosimeter, and pressure loss was measured by an initial pressure loss tester and indicated as relative comparative index. The precoating fluids A to D are as follows.

Precoating Fluid A

Obtained by dissolving a PVA (a polyvinyl alcohol) in water (ethanol in some Examples) so that the concentration became 7% by mass (3% by mass in some Examples).

Precoating Fluid B

Obtained by uniformly dispersing and mixing a carbon powder (particle diameter: 15 nm) in a 5% aqueous solution of CMC (carboxymethyl cellulose) as an organic binder so that the content of the carbon powder became 10% by mass.

Precoating Fluid C

A commercial alumina sol (solid content: 20% by mass, particle diameter: 15 nm)

Precoating Fluid D

Obtained by adding a commercial alumina sol (solid content: 20% by mass, particle diameter: 15 nm) to a cordierite powder (particle diameter: 0.4 μm) so that the solid content of the alumina sol became 5% by mass of the cordierite powder, and then adding water so that the content of the cordierite powder in the resulting mixture became 20% by mass.

After immersion in the precoating fluid, each honeycomb structure was pulled up from the precoating fluid and the excessive precoating fluid was removed by applying a compressed air of 4 MPa (absolute pressure). Then, the honeycomb structure was dried in a hot-air type drier set at 120° C. until the water was evaporated completely, whereby precoated supports were obtained. Each precoated support was measured for mass. From this result and the initial mass of honeycomb structure, there was calculated the mass of the precoating material coated on honeycomb structure. Incidentally, when the amount of precoating material loaded did not reach the intended level in one-time operation, the same coating operation (immersion in precoating fluid and drying) was repeated until the intended level was reached.

Water was added to a powder consisting of 70 parts by mass of a $\gamma Al_2O_3$ powder onto which Pt was fixed using a dinitrodiammineplatinum, solution, 20 parts by mass of a $CeO_2$ powder and 10 parts by mass of a $ZrO_2$ powder. The mixture was subjected to wet disintegration to prepare a catalyst slurry for formation of catalyst slurry. In this slurry were immersed the above-obtained precoated supports (of Examples 35 to 56) and a honeycomb structure of Comparative Example 6 which had not immersed in any precoating fluid, at room temperature at normal pressure for 10 minutes.

After immersion in the catalyst slurry, each precoated support and one honeycomb structure were pulled up from the catalyst slurry and the excessive catalyst slurry was removed by applying a compressed air of 0.4 MPa (absolute pressure). Then, the resulting structure was dried in a hot-air type drier set at 120° C. until the water was evaporated completely, whereby honeycomb catalytic structures were obtained. Each honeycomb catalytic structure was measured for mass. From this result, the mass of precoating material and the initial mass of honeycomb structure, there was calculated the mass of the catalyst layer loaded on honeycomb structure. Incidentally, when the amount of catalyst layer loaded did not reach the intended level in one-time operation, the same operation (immersion in catalyst slurry and drying) was repeated until the intended level was reached.

Then, each honeycomb catalytic structure was fired (was subjected to a heat treatment) in the air at 600° C. for 1 hour. In this firing step, the precoating material was burnt completely in the honeycomb catalytic structures which had used the precoating fluid A or B in production of precoated support, except in the honeycomb catalytic structure of Example 51 of incomplete burning. Each honeycomb catalytic structure after firing was measured for pressure loss and catalytic activity and the results are shown in Tables 5 to 9. Incidentally, the pressure loss was measured by an initial pressure loss tester and its result was shown as relative rating (relative comparative index) and the catalytic activity was measured by the same method as mentioned above.

TABLE 5

|  | Ex. 35 | Ex. 36 | Ex. 37 | Ex. 38 | Ex. 39 |
|---|---|---|---|---|---|
| Precoating fluid |  |  |  |  |  |
| Kind | A | A | A | A | A |
| Concentration (%) | 3 | 7 | 7 | 7 | 7 |
| Particle diameter of raw material | — | — | — | — | — |
| Viscosity (mPa·s) | 5 | 12 | 12 | 12 | 12 |
| Pressure in immersion (MPa) | 0.05 | 0.05 | 0.05 | 0.05 | 0.05 |
| Honeycomb structure |  |  |  |  |  |
| Cell structure Partition wall thickness (mil)/cell density (cpsi) | 12/300 | 12/300 | 12/300 | 12/300 | 12/300 |
| Pore volume per unit mass (cm$^3$/g) | 0.60 | 0.60 | 0.60 | 0.60 | 0.60 |
| Pore volume per unit volume, $V_2$ (cm$^3$/cm$^3$) | 0.19 | 0.19 | 0.19 | 0.19 | 0.19 |
| Average pore diameter (μm) | 55 | 55 | 55 | 55 | 55 |
| Reciprocal of average pore diameter, R (μm$^{-1}$) | 0.018 | 0.018 | 0.018 | 0.018 | 0.018 |
| Pressure loss *1 | 100 | 100 | 100 | 100 | 100 |
| Precoated support |  |  |  |  |  |
| Pore volume per unit mass (cm$^3$/g) | 0.57 | 0.59 | 0.57 | 0.57 | 0.54 |
| Precoating material mass per unit volume, $W_2$ (g/cm$^3$) | 0.005 | 0.002 | 0.005 | 0.005 | 0.010 |
| Reduction in pore volume, caused by coating of precoating material (after drying) (%) | 5.0 | 1.7 | 5.0 | 5.0 | 10.0 |
| $W_2/V_2 \times 100$ (%) | 2.60 | 1.04 | 2.60 | 2.60 | 5.21 |
| $W_2/R$ | 0.275 | 0.11 | 0.275 | 0.275 | 0.55 |
| Catalyst slurry |  |  |  |  |  |
| Viscosity (mPa·s) | 20 | 20 | 20 | 20 | 20 |
| Catalytic structure |  |  |  |  |  |
| Pore volume per unit mass (after drying) (cm$^3$/g) | 0.39 | 0.42 | 0.39 | 0.28 | 0.35 |
| Reduction in pore volume, caused by coating of precoating material and catalyst layer (after drying) (%) | 35.00 | 30.00 | 35.00 | 53.33 | 41.67 |
| Residue of precoating material after firing | None | None | None | None | None |
| Pore volume per unit mass (after firing) (cm$^3$/g) | 0.42 | 0.43 | 0.42 | 0.31 | 0.41 |
| Reduction in pore volume, caused by coating of precoating material and catalyst layer (after firing) (%) | 30.00 | 28.33 | 30.00 | 48.33 | 31.67 |
| Catalyst layer mass per unit volume, $W_3$ (g/cm$^3$) | 0.06 | 0.06 | 0.06 | 0.12 | 0.06 |
| Amount of Pt loaded per unit volume (g/liter) | 1 | 1 | 1 | 1 | 1 |
| $W_3/W_2$ | 12 | 30 | 12 | 24 | 6 |
| Pressure loss *2 | 130 | 150 | 130 | 150 | 130 |
| Catalytic activity *3 | 105 | 64 | 100 | 77 | 97 |

*1: Relative index,
*2: Relative index,
*3: Relative index

TABLE 6

|  | Ex. 40 | Ex. 41 | Ex. 42 | Ex. 43 | Ex. 44 |
|---|---|---|---|---|---|
| Precoating fluid |  |  |  |  |  |
| Kind | A | A | A | A | A |
| Concentration (%) | 7 | 7 | 7 | 7 | 7 |
| Particle diameter of raw material | — | — | — | — | — |
| Viscosity (mPa·s) | 12 | 12 | 12 | 12 | 12 |
| Pressure in immersion (MPa) | 0.05 | 0.05 | 0.05 | 0.05 | 0.05 |
| Honeycomb structure |  |  |  |  |  |
| Cell structure Partition wall thickness (mil)/cell density (cpsi) | 17/100 | 12/300 | 17/100 | 12/300 | 12/300 |
| Pore volume per unit mass (cm$^3$/g) | 0.60 | 0.60 | 0.60 | 0.60 | 0.60 |
| Pore volume per unit volume, $V_2$ (cm$^3$/cm$^3$) | 0.17 | 0.19 | 0.17 | 0.19 | 0.19 |
| Average pore diameter (μm) | 55 | 55 | 55 | 70 | 80 |
| Reciprocal of average pore diameter, R (μm$^{-1}$) | 0.018 | 0.018 | 0.018 | 0.014 | 0.013 |
| Pressure loss *1 | 90 | 100 | 90 | 85 | 75 |
| Precoated support |  |  |  |  |  |
| Pore volume per unit mass (cm$^3$/g) | 0.54 | 0.47 | 0.47 | 0.47 | 0.47 |
| Precoating material mass per unit volume, $W_2$ (g/cm$^3$) | 0.010 | 0.020 | 0.020 | 0.020 | 0.020 |
| Reduction in pore volume, caused by coating of precoating material (after drying) (%) | 10.0 | 21.7 | 21.7 | 21.7 | 21.7 |
| $W_2/V_2 \times 100$ (%) | 5.95 | 10.42 | 11.90 | 10.42 | 10.42 |
| $W_2/R$ | 0.55 | 1.1 | 1.1 | 1.4 | 1.6 |
| Catalyst slurry |  |  |  |  |  |
| Viscosity (mPa·s) | 20 | 20 | 20 | 20 | 20 |
| Catalytic structure |  |  |  |  |  |
| Pore volume per unit mass (after drying) (cm$^3$/g) | 0.35 | 0.27 | 0.27 | 0.27 | 0.27 |
| Reduction in pore volume, caused by coating of precoating material and catalyst layer (after drying) (%) | 41.67 | 55.00 | 55.00 | 55.00 | 55.00 |
| Residue of precoating material after firing | None | None | None | None | None |
| Pore volume per unit mass (after firing) (cm$^3$/g) | 0.41 | 0.40 | 0.40 | 0.40 | 0.40 |
| Reduction in pore volume, caused by coating of precoating material and catalyst layer (after firing) (%) | 31.67 | 33.33 | 33.33 | 33.33 | 33.33 |
| Catalyst layer mass per unit volume, $W_3$ (g/cm$^3$) | 0.06 | 0.06 | 0.06 | 0.06 | 0.06 |
| Amount of Pt loaded per unit volume (g/liter) | 1 | 1 | 1 | 1 | 1 |
| $W_3/W_2$ | 6 | 3 | 3 | 3 | 3 |
| Pressure loss *2 | 120 | 135 | 140 | 120 | 120 |
| Catalytic activity *3 | 96 | 91 | 90 | 85 | 81 |

*1: Relative index,
*2: Relative index,
*3: Relative index

TABLE 7

|  | Ex. 45 | Ex. 46 | Ex. 47 | Ex. 48 | Ex. 49 |
|---|---|---|---|---|---|
| Precoating fluid |  |  |  |  |  |
| Kind | A | A | A | A | A |
| Concentration (%) | 7 | 7 | 7 | 7 | 7 |
| Particle diameter of raw material | — | — | — | — | — |
| Viscosity (mPa·s) | 12 | 12 | 12 | 12 | 12 |
| Pressure in immersion (MPa) | 0.05 | 0.05 | 0.05 | 0.05 | 0.05 |
| Honeycomb structure |  |  |  |  |  |
| Cell structure Partition wall thickness (mil)/cell density (cpsi) | 12/300 | 12/300 | 12/300 | 17/100 | 12/300 |
| Pore volume per unit mass (cm$^3$/g) | 0.49 | 0.49 | 0.74 | 0.74 | 0.74 |
| Pore volume per unit volume, $V_2$ (cm$^3$/cm$^3$) | 0.18 | 0.18 | 0.21 | 0.19 | 0.21 |
| Average pore diameter (μm) | 55 | 55 | 55 | 55 | 55 |
| Reciprocal of average pore diameter, R (μm$^{-1}$) | 0.018 | 0.018 | 0.018 | 0.018 | 0.018 |
| Pressure loss *1 | 130 | 130 | 70 | 65 | 70 |
| Precoated support |  |  |  |  |  |
| Pore volume per unit mass (cm$^3$/g) | 0.46 | 0.34 | 0.71 | 0.71 | 0.73 |
| Precoating material mass per unit volume, $W_2$ (g/cm$^3$) | 0.005 | 0.005 | 0.005 | 0.005 | 0.001 |
| Reduction in pore volume, caused by coating of precoating material (after drying) (%) | 6.1 | 30.6 | 4.1 | 4.1 | 1.35 |
| $W_2/V_2 \times 100$ (%) | 2.76 | 11.03 | 2.33 | 2.70 | 0.47 |
| $W_2/R$ | 0.275 | 1.1 | 0.275 | 0.275 | 0.055 |
| Catalyst slurry |  |  |  |  |  |
| Viscosity (mPa·s) | 20 | 20 | 20 | 20 | 20 |
| Catalytic structure |  |  |  |  |  |
| Pore volume per unit mass (after drying) (cm$^3$/g) | 0.27 | 0.15 | 0.55 | 0.55 | 0.58 |
| Reduction in pore volume, caused by coating of precoating material and catalyst layer (after drying) (%) | 44.90 | 69.39 | 25.68 | 25.68 | 21.62 |
| Residue of precoating material after firing | None | None | None | None | None |
| Pore volume per unit mass (after firing) (cm$^3$/g) | 0.30 | 0.30 | 0.58 | 0.58 | 0.59 |
| Reduction in pore volume, caused by coating of precoating material and catalyst layer (after firing) (%) | 38.78 | 38.78 | 21.62 | 21.62 | 20.27 |
| Catalyst layer mass per unit volume, $W_3$ (g/cm$^3$) | 0.06 | 0.06 | 0.06 | 0.06 | 0.06 |
| Amount of Pt loaded per unit volume (g/liter) | 1 | 1 | 1 | 1 | 1 |
| $W_3/W_2$ | 12 | 3 | 12 | 12 | 60 |
| Pressure loss *2 | 170 | 170 | 90 | 85 | 130 |
| Catalytic activity *3 | 79 | 77 | 122 | 120 | 55 |

*1: Relative index,
*2: Relative index,
*3: Relative index

TABLE 8

|  | Ex. 50 | Ex. 51 | Ex. 52 | Ex. 53 |
|---|---|---|---|---|
| Precoating fluid |  |  |  |  |
| Kind | A | A | A | A |
| Concentration (%) | 7 | 7 | 7 | 7 |
| Particle diameter of raw material | — | — | — | — |
| Viscosity (mPa·s) | 12 | 12 | 12 | 8 (Ethanol used) |
| Pressure in immersion (MPa) | 0.05 | 0.05 | Atmosphere | Atmosphere |
| Honeycomb structure |  |  |  |  |
| Cell structure Partition wall thickness (mil)/cell density (cpsi) | 17/100 | 12/300 | 12/300 | 12/300 |
| Pore volume per unit mass (cm$^3$/g) | 0.74 | 0.60 | 0.60 | 0.60 |
| Pore volume per unit volume, $V_2$ (cm$^3$/cm$^3$) | 0.19 | 0.19 | 0.19 | 0.19 |
| Average pore diameter (μm) | 55 | 20 | 55 | 55 |
| Reciprocal of average pore diameter, R (μm$^{-1}$) | 0.018 | 0.018 | 0.018 | 0.018 |
| Pressure loss *1 | 65 | 145 | 100 | 100 |
| Precoated support |  |  |  |  |
| Pore volume per unit mass (cm$^3$/g) | 0.73 | 0.41 | 0.55 | 0.58 |
| Precoating material mass per unit volume, $W_2$ (g/cm$^3$) | 0.001 | 0.005 | 0.005 | 0.005 |
| Reduction in pore volume, caused by coating of precoating material (after drying) (%) | 1.35 | 31.7 | 8.3 | 3.3 |
| $W_2/V_2 \times 100$ (%) | 0.54 | 2.60 | 2.60 | 2.60 |
| $W_2/R$ | 0.055 | 0.1 | 0.275 | 0.275 |

TABLE 8-continued

|  | Ex. 50 | Ex. 51 | Ex. 52 | Ex. 53 |
|---|---|---|---|---|
| Catalyst slurry |  |  |  |  |
| Viscosity (mPa·s) | 20 | 20 | 20 | 20 |
| Catalytic structure |  |  |  |  |
| Pore volume per unit mass (after drying) (cm³/g) | 0.58 | 0.19 | 0.34 | 0.40 |
| Reduction in pore volume, caused by coating of precoating material and catalyst layer (after drying) (%) | 21.62 | 68.33 | 43.33 | 33.33 |
| Residue of precoating material after firing | None | Present (Incomplete burning) | None | None |
| Pore volume per unit mass (after firing) (cm³/g) | 0.59 | 0.25 | 0.39 | 0.42 |
| Reduction in pore volume, caused by coating of precoating material and catalyst layer (after firing) (%) | 20.27 | 58.33 | 35.00 | 30.00 |
| Catalyst layer mass per unit volume, $W_3$ (g/cm³) | 0.06 | 0.06 | 0.06 | 0.06 |
| Amount of Pt loaded per unit volume (g/liter) | 1 | 1 | 1 | 1 |
| $W_3/W_2$ | 60 | 12 | 12 | 12 |
| Pressure loss *2 | 125 | 205 | 135 | 130 |
| Catalytic activity *3 | 55 | 40 | 93 | 96 |

*1: Relative index,
*2: Relative index,
*3: Relative index

TABLE 9

|  | Ex. 54 | Ex. 55 | Ex. 56 | Comp. Ex. 6 |
|---|---|---|---|---|
| Precoating fluid |  |  |  |  |
| Kind | B | C | D | — |
| Concentration (%) | 10 | (20) | 20 | — |
| Particle diameter of raw material | 15 nm | (15 nm) | 0.4 μm | — |
| Viscosity (mPa·s) | 18 | 15 | 12 | — |
| Pressure in immersion (MPa) | 0.05 | 0.05 | 0.05 | — |
| Honeycomb structure |  |  |  |  |
| Cell structure Partition wall thickness (mil)/cell density (cpsi) | 12/300 | 12/300 | 12/300 | 12/300 |
| Pore volume per unit mass (cm³/g) | 0.60 | 0.60 | 0.60 | 0.60 |
| Pore volume per unit volume, $V_2$ (cm³/cm³) | 0.19 | 0.19 | 0.19 | 0.19 |
| Average pore diameter (μm) | 55 | 55 | 55 | 55 |
| Reciprocal of average pore diameter, R (μm$^{-1}$) | 0.018 | 0.018 | 0.018 | 0.018 |
| Pressure loss *1 | 100 | 100 | 100 | 100 |
| Precoated support |  |  |  |  |
| Pore volume per unit mass (cm³/g) | 0.56 | 0.57 | 0.56 | — |
| Precoating material mass per unit volume, $W_2$ (g/cm³) | 0.007 | 0.007 | 0.010 | — |
| Reduction in pore volume, caused by coating of precoating material (after drying) (%) | 6.7 | 5.0 | 6.7 | — |
| $W_2/V_2 \times 100$ (%) | 3.65 | 3.65 | 5.21 | — |
| $W_2/R$ | 0.385 | 0.385 | 0.55 | — |
| Catalyst slurry |  |  |  |  |
| Viscosity (mPa·s) | 20 | 20 | 20 | 20 |
| Catalytic structure |  |  |  |  |
| Pore volume per unit mass (after drying) (cm³/g) | 0.37 | 0.39 | 0.37 | — |
| Reduction in pore volume, caused by coating of precoating material and catalyst layer (after drying) (%) | 38.33 | 35.00 | 38.33 | — |
| Residue of precoating material after firing | None | Present | Present | — |
| Pore volume per unit mass (after firing) (cm³/g) | 0.41 | 0.39 | 0.37 | — |
| Reduction in pore volume, caused by coating of precoating material and catalyst layer (after firing) (%) | 31.67 | 35.00 | 38.33 | — |
| Catalyst layer mass per unit volume, $W_3$ (g/cm³) | 0.06 | 0.06 | 0.06 | 0.06 |
| Amount of Pt loaded per unit volume (g/liter) | 1 | 1 | 1 | 1 |
| $W_3/W_2$ | 9 | 9 | 6 | — |
| Pressure loss *2 | 130 | 135 | 140 | 220 |
| Catalytic activity *3 | 98 | 95 | 91 | 43 |

*1: Relative index,
*2: Relative index,
*3: Relative index

As shown in Tables 5 to 9, the honeycomb catalytic structures of Examples 35 to 56 obtained by loading a catalyst layer on a precoated support, as compared with the honeycomb catalytic structure of Comparative Example 6 obtained by loading a catalyst layer directly on a honeycomb structure without coating a precoating material on the honeycomb structure, generally showed good pressure loss and good catalytic activity.

Industrial Applicability

The present invention can be preferably used as a catalytic structure for purification of to-be-purified components (e.g. CO, HC, NOx and SOx) contained in exhaust gases emitted from automobiles engines, construction equipment engines and stationary engines for industries as well as combustion equipment, etc.; as a precoated support used for production of the catalytic structure; and as a process for production of the catalytic structure.

The invention claimed is:

1. A honeycomb catalytic structure comprising:
a honeycomb structure comprising porous partition walls having a large number of pores, disposed so as to form a plurality of cells extending between two end faces of the honeycomb structure and plugging portions disposed at either one end of each cell, and
a catalyst layer containing a catalyst, supported at least on inner surfaces of the pores of the honeycomb structure, the pores having an average pore diameter of greater than or equal to 50 μm but not more than 500 μm;
wherein:
a mass of the catalyst layer per unit volume (1 cm$^3$) of the honeycomb structure (g/cm$^3$) is 60% or less of a volume of pores per unit volume (1 cm$^3$) of the honeycomb structure (cm$^3$/cm$^3$),
the partition walls have a thickness of 0.15 mm to 0.45 mm, a cell density of the honeycomb structure is 100 cpsi to 300 cpsi, and
at least part of inner surfaces of pores of the porous partition walls having a large number of pores, disposed so as to form a plurality of cells extending between two end faces of the honeycomb structure, are coated with a substance containing no noble metal.

2. The honeycomb catalytic structure according to claim 1, wherein 20% or more of the inner surfaces of pores is in contact with the catalyst layer.

3. A honeycomb catalytic structure comprising:
a honeycomb structure comprising porous partition walls having a large number of pores, disposed so as to form a plurality of cells extending between two end faces of the honeycomb structure and plugging portions disposed at either one end of each cell, and
a catalyst layer containing a catalyst, supported at least on inner surfaces of the pores of the honeycomb structure, wherein the catalyst layer is made of particles and a 50% particle diameter ($D_{50}$) of the particles is greater than or equal to 1.7 μm and is 70% or less of an average pore diameter of the pores, wherein the average pore diameter is greater than or equal to 50 μm but not more than 500 μm and
at least part of inner surfaces of pores of the porous partition walls having a large number of pores, disposed so as to form a plurality of cells extending between two end faces of the honeycomb structure, are coated with a substance containing no noble metal.

4. A honeycomb catalytic structure comprising:
a honeycomb structure comprising porous partition walls having a large number of pores, disposed so as to form a plurality of cells extending between two end faces of the honeycomb structure and plugging portions disposed at either one end of each cell, and
a catalyst layer containing a catalyst, supported at least on inner surfaces of the pores of the honeycomb structure, wherein the catalyst layer is made of particles and the 90% particle diameter ($D_{90}$) of the particles is greater than or equal to 5.2 μm and is 100% or less of the average pore diameter of the pores, wherein the average pore diameter is greater than or equal to 50 μm but not more than 500 μm, and
at least part of inner surfaces of pores of the porous partition walls having a large number of pores, disposed so as to form a plurality of cells extending between two end faces of the honeycomb structure, are coated with a substance containing no noble metal.

5. A precoated support for a honeycomb structure comprising porous partition walls obtained by coating at least part of inner surfaces of pores of the partition walls having a large number of pores, disposed so as to form a plurality of cells extending between two and faces of the honeycomb structure with a substance containing no noble metal selected from the group consisting of polymers, carbon, oils, fats, silica sols, alumina sols, catalyst slurries containing no noble metal, a slurry of a powder of a material of the support, and slurries containing inorganic material particles, wherein the honeycomb structure comprises porous partition walls having a large number of pores, disposed so as to form a plurality of cells extending between two end faces of the honeycomb structure and plugging portions disposed at either one end of each cell,
wherein the average pore diameter is greater than or equal to 50 μm but not more than 500 μm, and the mass of the precoating material per unit volume (1 cm$^3$) of the honeycomb structure (g/cm$^3$) is from 0.4 to 12%.

6. A honeycomb catalytic structure comprising:
precoated support set forth in claim 5; and
a catalyst layer containing a catalyst, supported on the precoated support.

7. A process for producing a honeycomb catalyst structure of claim 1 comprising a honeycomb structure comprising porous partition walls, the process comprising:
coating at least part of inner surfaces of pores of the partition walls having a large number of pores, disposed so as to form a plurality of cells extending between two end faces of the honeycomb structure with a substance containing no noble metal, which honeycomb structure comprises porous partition walls having a large number of pores, disposed so as to form a plurality of cells extending between two end faces of the honeycomb structure and plugging portions disposed at either one end of each cell, to obtain a precoated support and then loading on the precoated support a catalyst layer containing a catalyst.

8. The honeycomb catalytic structure according to claim 1, wherein the substance containing no noble metal is selected from the group consisting of polymers, carbon, oils, fats, silica sols, alumina sols, catalyst slurries containing no noble metal, a slurry of a powder of a material of the support, and slurries containing inorganic material particles.

* * * * *